United States Patent
Ngai et al.

(10) Patent No.: US 9,571,979 B2
(45) Date of Patent: Feb. 14, 2017

(54) METHODS AND APPARATUS FOR CELL TOWER LOCATION ESTIMATION USING MULTIPLE TYPES OF DATA SOURCES

(71) Applicant: The Nielsen Company (US), LLC, New York, NY (US)

(72) Inventors: Dominic Ngai, Allen, TX (US); Sreenivas Sonnaila, Hyderabad (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/735,708

(22) Filed: Jun. 10, 2015

(65) Prior Publication Data

US 2016/0366558 A1 Dec. 15, 2016

(51) Int. Cl.
*H04W 4/02* (2009.01)
*H04W 24/10* (2009.01)

(52) U.S. Cl.
CPC ............. *H04W 4/025* (2013.01); *H04W 4/023* (2013.01); *H04W 24/10* (2013.01)

(58) Field of Classification Search
CPC ........ H04W 64/00; H04W 4/04; H04W 4/021; H04W 40/20; H04W 84/045; G01S 5/0263; G01S 5/00; G06F 2221/2111; H04M 15/8055; H04M 15/8061

See application file for complete search history.

(56) References Cited

U.S. PATENT DOCUMENTS

| | | |
|---|---|---|
| 5,493,286 A | 2/1996 | Grube et al. |
| 5,552,795 A | 9/1996 | Tayloe et al. |
| 5,754,657 A | 5/1998 | Schipper et al. |

(Continued)

FOREIGN PATENT DOCUMENTS

| | | |
|---|---|---|
| EP | 0895435 | 2/1999 |
| EP | 1011283 | 6/2000 |

(Continued)

OTHER PUBLICATIONS

How to Interpret the Cellular/Mobile Equipment Maps, http://www.geckobeach.com/cellular/maps/mapsfaqs.php, downloaded Feb. 21, 2008, 4 pages.

(Continued)

*Primary Examiner* — Nizar Sivji
(74) *Attorney, Agent, or Firm* — Hanley, Flight & Zimmerman, LLC

(57) ABSTRACT

Methods and apparatus are disclosed for estimating, based on data collected from multiple types of data sources, the locations of cell towers. A first source is ranked relative to a second source based on the associated accuracy of each source with respect to estimating the location of a cell tower. Data collected from the higher-ranking source is used to identify estimated locations for cell towers from which such data has been collected. Data collected from the lower-ranking source is thereafter used to identify estimated locations for cell towers from which such data has been collected, to the extent that an estimated location for the cell tower has not already been identified via the data collected from the higher-ranking source. In an example method, the higher-ranking source is associated with RF Layer 3 data and/or messages, and the lower-ranking source is associated with RF Layer 1 data and/or messages.

18 Claims, 27 Drawing Sheets

(56) References Cited

U.S. PATENT DOCUMENTS

| | | | |
|---|---|---|---|
| 5,884,175 | A | 3/1999 | Schiefer et al. |
| 5,982,305 | A | 11/1999 | Taylor |
| 6,052,306 | A | 4/2000 | Sedlak et al. |
| 6,052,406 | A | 4/2000 | Epstein et al. |
| 6,101,175 | A | 8/2000 | Schorman et al. |
| 6,236,365 | B1 | 5/2001 | LeBlanc et al. |
| 6,628,953 | B1 | 9/2003 | Dillon et al. |
| 6,717,547 | B2 | 4/2004 | Spilker, Jr. et al. |
| 6,782,264 | B2 | 8/2004 | Anderson |
| 6,947,703 | B2 | 9/2005 | Ceresoli et al. |
| 6,999,766 | B1 | 2/2006 | Padovani |
| 7,089,003 | B2 | 8/2006 | Fingerhut et al. |
| 7,127,257 | B2 | 10/2006 | Riley et al. |
| 7,136,659 | B2 | 11/2006 | Khushu et al. |
| 7,167,713 | B2 | 1/2007 | Anderson |
| 7,194,281 | B2 | 3/2007 | Peng et al. |
| 7,203,510 | B2 | 4/2007 | Tanoue |
| 7,302,243 | B2 | 11/2007 | Tarbouriech |
| 7,409,214 | B2 | 8/2008 | Lee |
| 7,463,895 | B2 | 12/2008 | Shintai et al. |
| 7,546,111 | B2 | 6/2009 | Nakano |
| 7,623,823 | B2 | 11/2009 | Zito et al. |
| 7,724,725 | B2 | 5/2010 | Choksi |
| 7,734,309 | B2 | 6/2010 | Chi et al. |
| 7,751,833 | B2 | 7/2010 | Mansour et al. |
| 7,764,231 | B1 | 7/2010 | Karr et al. |
| 7,783,312 | B2 | 8/2010 | Mudigonda et al. |
| 7,885,239 | B1 | 2/2011 | Oroskar et al. |
| 7,933,612 | B2 | 4/2011 | Counts et al. |
| 8,060,102 | B2 | 11/2011 | Gazzola |
| 8,165,599 | B1 * | 4/2012 | Dronamraju .......... H04W 64/00 455/456.1 |
| 8,219,112 | B1 | 7/2012 | Youssef et al. |
| 8,346,282 | B1 | 1/2013 | Dronamraju et al. |
| 8,374,228 | B2 | 2/2013 | Sanderford, Jr. et al. |
| 8,433,334 | B2 | 4/2013 | Huang et al. |
| 8,447,293 | B2 | 5/2013 | Stapleton et al. |
| 8,805,407 | B2 | 8/2014 | Ngai |
| 8,886,161 | B2 | 11/2014 | Ngai |
| 9,100,926 | B2 | 8/2015 | Ngai et al. |
| 9,253,649 | B2 | 2/2016 | Ngai |
| 9,326,266 | B2 | 4/2016 | Ngai et al. |
| 2003/0235180 | A1 | 12/2003 | Oprescu-Surcobe et al. |
| 2004/0202131 | A1 | 10/2004 | An et al. |
| 2005/0043046 | A1 | 2/2005 | Lee |
| 2005/0100113 | A1 | 5/2005 | Corts et al. |
| 2005/0287954 | A1 | 12/2005 | Lim et al. |
| 2006/0089153 | A1 | 4/2006 | Sheynblat |
| 2006/0240840 | A1 * | 10/2006 | Morgan .................. G01S 5/02 455/456.1 |
| 2007/0058678 | A1 | 3/2007 | Thompson, III et al. |
| 2007/0060084 | A1 | 3/2007 | Thompson, III et al. |
| 2007/0174876 | A1 | 7/2007 | Maggio et al. |
| 2007/0243864 | A1 | 10/2007 | Jaquet |
| 2008/0249976 | A1 | 10/2008 | Ojanpera |
| 2008/0293393 | A1 | 11/2008 | Hartmaier |
| 2009/0312036 | A1 * | 12/2009 | Alizadeh-Shabdiz G01S 5/0263 455/456.1 |
| 2010/0082688 | A1 | 4/2010 | Davis et al. |
| 2010/0242103 | A1 | 9/2010 | Richardson et al. |
| 2010/0246544 | A1 | 9/2010 | Brisebois et al. |
| 2010/0257052 | A1 | 10/2010 | Zito et al. |
| 2011/0066045 | A1 | 3/2011 | Moon et al. |
| 2012/0032819 | A1 | 2/2012 | Chae et al. |
| 2012/0101827 | A1 | 4/2012 | Topchy et al. |
| 2012/0108266 | A1 | 5/2012 | Clark et al. |
| 2012/0289269 | A1 | 11/2012 | Kumagai |
| 2013/0095861 | A1 * | 4/2013 | Li ........................ G01S 5/0263 455/456.6 |
| 2013/0189977 | A1 | 7/2013 | Brisebois et al. |
| 2013/0286990 | A1 | 10/2013 | Park et al. |
| 2013/0310032 | A1 | 11/2013 | ISLAM et al. |
| 2014/0066060 | A1 | 3/2014 | Ngai |
| 2014/0099914 | A1 | 4/2014 | Ngai |
| 2014/0268108 | A1 | 9/2014 | Grau |
| 2014/0329524 | A1 | 11/2014 | Ngai |
| 2015/0038160 | A1 | 2/2015 | Ngai et al. |
| 2015/0043773 | A1 * | 2/2015 | Chiussi ................. G06T 7/0044 382/103 |
| 2015/0063154 | A1 | 3/2015 | Ngai |
| 2015/0341896 | A1 | 11/2015 | Ngai et al. |
| 2016/0119795 | A1 | 4/2016 | Ngai |

FOREIGN PATENT DOCUMENTS

| | | |
|---|---|---|
| JP | H09312870 | 12/1997 |
| WO | 9853621 | 11/1998 |
| WO | 0205577 | 1/2002 |

OTHER PUBLICATIONS

CDMA Basics, from Dolcera Wiki, http://www.dolcera.com/wiki/index.php?title=CDMA_Basics, downloaded Feb. 21, 2008, 9 pages.

Google Press Center Announcement, Google Announces Launch of Google Maps for Mobile With "My Location" Technology, http://www.google.com/intl/en/press/annc/20071128_maps_mobile_my_. . . , Nov. 28, 2007, 1 page.

United States Patent and Trademark Office, "Notice of Allowance and Fee(s) Due," issued in connection with U.S. Appl. No. 12/140,896, Jan. 22, 2013, 5 pages.

United States Patent and Trademark Office, "Non-Final Office Action," issued in connection with U.S. Appl. No. 12/140,896, Mar. 29, 2012, 7 pages.

European Patent Office, "Extended European Search Report," issued in connection with Application No. 09007946.8, May 31, 2013, 7 pages.

United States Patent and Trademark Office, "Ex Parte Quayle Action", issued in connection with U.S. Appl. No. 13/601,710, dated Jan. 2, 2014 (10 pages).

United States Patent and Trademark Office, "Notice of Allowance", issued in connection with U.S. Appl. No. 13/601,710, dated Apr. 1, 2014 (5 pages).

United States Patent and Trademark Office, "Non-Final Office Action", issued in connection with U.S. Appl. No. 14/334,143, dated May 28, 2015 (13 pages).

United States Patent and Trademark Office, "Non-Final Office Action", issued in connection with U.S. Appl. No. 13/646,308, dated Nov. 7, 2013 (7 pages).

United States Patent and Trademark Office, "Notice of Allowance", issued in connection with U.S. Appl. No. 13/646,308, dated Mar. 17, 2014 (7 pages).

United States Patent and Trademark Office, "Notice of Allowance", issued in connection with U.S. Appl. No. 13/646,308, dated Jul. 8, 2014 (7 pages).

United States Patent and Trademark Office, "Notice of Allowance", issued in connection with U.S. Appl. No. 13/957,164, dated Mar. 30, 2015 (16 pages).

United States Patent and Trademark Office, "Notice of Allowance," issued in connection with U.S. Appl. No. 14/334,143, mailed on Sep. 28, 2015, 19 pages.

United States Patent and Trademark Office, "Notice of Allowance," issued in connection with U.S. Appl. No. 14/816,855, mailed on Dec. 23, 2015, 26 pages.

United States Patent and Trademark Office, "Non-Final Office Action," issued in connection with U.S. Appl. No. 14/986,303, mailed on Aug. 22, 2016, 40 pages.

United States Patent and Trademark Office, "Non-Final Office Action," issued in connection with U.S. Appl. No. 14/537,128, mailed on Oct. 13, 2016, 16 pages.

United States Patent and Trademark Office, "Notice of Allowance," issued in connection with U.S. Appl. No. 15/131,761, mailed on Oct. 21, 2016, 40 pages.

* cited by examiner

COLLECTED DATA 500

| Message Timestamp | Message Latitude | Message Longitude | Message Content |
|---|---|---|---|
| T0 | MSG_LAT1 | MSG_LONG1 | <RF Layer 3 SYNC> |
| T1 | MSG_LAT2 | MSG_LONG2 | <RF Layer 3 SYSTEM PARAMETERS> |
| T2 | MSG_LAT3 | MSG_LONG3 | <RF Layer 1 Signal Power> |
| T3 | MSG_LAT4 | MSG_LONG4 | <RF Layer 1 Signal Power> |
| T4 | MSG_LAT5 | MSG_LONG5 | <RF Layer 3 SYNC> |
| T5 | MSG_LAT6 | MSG_LONG6 | <RF Layer 3 SYSTEM PARAMETERS> |
| T6 | MSG_LAT7 | MSG_LONG7 | <RF Layer 1 Signal Power> |
| T7 | MSG_LAT8 | MSG_LONG8 | <RF Layer 1 Signal Power> |
| T8 | MSG_LAT9 | MSG_LONG9 | <RF Layer 3 SYNC> |
| T9 | MSG_LAT10 | MSG_LONG10 | <RF Layer 3 SYSTEM PARAMETERS> |

COLLECTED DATA 700

| | Message Timestamp | Message Latitude | Message Longitude | Message Content | Source Type |
|---|---|---|---|---|---|
| 702 | T0 | MSG_LAT1 | MSG_LONG1 | <RF Layer 3 SYNC> | RF Layer 3 |
| 704 | T1 | MSG_LAT2 | MSG_LONG2 | <RF Layer 3 SYSTEM PARAMETERS> | RF Layer 3 |
| 706 | T2 | MSG_LAT3 | MSG_LONG3 | <RF Layer 1 Signal Power> | RF Layer 1 |
| 708 | T3 | MSG_LAT4 | MSG_LONG4 | <RF Layer 1 Signal Power> | RF Layer 1 |
| 710 | T4 | MSG_LAT5 | MSG_LONG5 | <RF Layer 3 SYNC> | RF Layer 3 |
| 712 | T5 | MSG_LAT6 | MSG_LONG6 | <RF Layer 3 SYSTEM PARAMETERS> | RF Layer 3 |
| 714 | T6 | MSG_LAT7 | MSG_LONG7 | <RF Layer 1 Signal Power> | RF Layer 1 |
| 716 | T7 | MSG_LAT8 | MSG_LONG8 | <RF Layer 1 Signal Power> | RF Layer 1 |
| 718 | T8 | MSG_LAT9 | MSG_LONG9 | <RF Layer 3 SYNC> | RF Layer 3 |
| 720 | T9 | MSG_LAT10 | MSG_LONG10 | <RF Layer 3 SYSTEM PARAMETERS> | RF Layer 3 |

FIG. 7

COLLECTED DATA FROM RF LAYER 3 SOURCES

| Message Timestamp | Message Latitude | Message Longitude | Message Content |
|---|---|---|---|
| T0 | MSG_LAT1 | MSG_LONG1 | <RF Layer 3 SYNC> |
| T1 | MSG_LAT2 | MSG_LONG2 | <RF Layer 3 SYSTEM PARAMETERS> |
| T4 | MSG_LAT5 | MSG_LONG5 | <RF Layer 3 SYNC> |
| T5 | MSG_LAT6 | MSG_LONG6 | <RF Layer 3 SYSTEM PARAMETERS> |
| T8 | MSG_LAT9 | MSG_LONG9 | <RF Layer 3 SYNC> |
| T9 | MSG_LAT10 | MSG_LONG10 | <RF Layer 3 SYSTEM PARAMETERS> |

800

COLLECTED DATA FROM RF LAYER 1 SOURCES

| Message Timestamp | Message Latitude | Message Longitude | Message Content |
|---|---|---|---|
| T2 | MSG_LAT3 | MSG_LONG3 | <RF Layer 1 Signal Power> |
| T3 | MSG_LAT4 | MSG_LONG4 | <RF Layer 1 Signal Power> |
| T6 | MSG_LAT7 | MSG_LONG7 | <RF Layer 1 Signal Power> |
| T7 | MSG_LAT8 | MSG_LONG8 | <RF Layer 1 Signal Power> |

| SOURCE RANKER | | |
|---|---|---|
| Source Type | Associated Accuracy | Source Rank |
| RF Layer 3 | HIGH | 1 |
| RF Layer 1 | LOW | 2 |

FIG. 9

COLLECTED DATA 1000

| | Message Timestamp | Message Latitude | Message Longitude | Message Content | Source Type | Source Rank |
|---|---|---|---|---|---|---|
| 1002 | T0 | MSG_LAT1 | MSG_LONG1 | <RF Layer 3 SYNC> | RF Layer 3 | 1 |
| 1004 | T1 | MSG_LAT2 | MSG_LONG2 | <RF Layer 3 SYSTEM PARAMETERS> | RF Layer 3 | 1 |
| 1006 | T2 | MSG_LAT3 | MSG_LONG3 | <RF Layer 1 Signal Power> | RF Layer 1 | 2 |
| 1008 | T3 | MSG_LAT4 | MSG_LONG4 | <RF Layer 1 Signal Power> | RF Layer 1 | 2 |
| 1010 | T4 | MSG_LAT5 | MSG_LONG5 | <RF Layer 3 SYNC> | RF Layer 3 | 1 |
| 1012 | T5 | MSG_LAT6 | MSG_LONG6 | <RF Layer 3 SYSTEM PARAMETERS> | RF Layer 3 | 1 |
| 1014 | T6 | MSG_LAT7 | MSG_LONG7 | <RF Layer 1 Signal Power> | RF Layer 1 | 2 |
| 1016 | T7 | MSG_LAT8 | MSG_LONG8 | <RF Layer 1 Signal Power> | RF Layer 1 | 2 |
| 1018 | T8 | MSG_LAT9 | MSG_LONG9 | <RF Layer 3 SYNC> | RF Layer 3 | 1 |
| 1020 | T9 | MSG_LAT10 | MSG_LONG10 | <RF Layer 3 SYSTEM PARAMETERS> | RF Layer 3 | 1 |

FIG. 10

| COLLECTED DATA FROM RF LAYER 3 SOURCES — SOURCE RANK 1 | | |
|---|---|---|
| Message Timestamp | Message Latitude | Message Longitude | Message Content |
| T0 | MSG_LAT1 | MSG_LONG1 | <RF Layer 3 SYNC> |
| T1 | MSG_LAT2 | MSG_LONG2 | <RF Layer 3 SYSTEM PARAMETERS> |
| T4 | MSG_LAT5 | MSG_LONG5 | <RF Layer 3 SYNC> |
| T5 | MSG_LAT6 | MSG_LONG6 | <RF Layer 3 SYSTEM PARAMETERS> |
| T8 | MSG_LAT9 | MSG_LONG9 | <RF Layer 3 SYNC> |
| T9 | MSG_LAT10 | MSG_LONG10 | <RF Layer 3 SYSTEM PARAMETERS> |

| COLLECTED DATA FROM RF LAYER 1 SOURCES — SOURCE RANK 2 | | |
|---|---|---|
| Message Timestamp | Message Latitude | Message Longitude | Message Content |
| T2 | MSG_LAT3 | MSG_LONG3 | <RF Layer 1 Signal Power> |
| T3 | MSG_LAT4 | MSG_LONG4 | <RF Layer 1 Signal Power> |
| T6 | MSG_LAT7 | MSG_LONG7 | <RF Layer 1 Signal Power> |
| T7 | MSG_LAT8 | MSG_LONG8 | <RF Layer 1 Signal Power> |

FIG. 11

| | PAIRED RF LAYER 3 DATA RECORDS | | | | | | |
|---|---|---|---|---|---|---|---|
| Message Timestamp | Message Latitude | Message Longitude | Signal ID | Sector ID | Transmitter Latitude | Transmitter Longitude |
| Tp0 | MSG_LAT1 | MSG_LONG1 | 1 | 1001 | X1 | Y1 |
| Tp1 | MSG_LAT2 | MSG_LONG2 | 2 | 1002 | X1 | Y1 |
| Tp2 | MSG_LAT3 | MSG_LONG3 | 63 | 1001 | X1 | Y1 |
| Tp3 | MSG_LAT4 | MSG_LONG4 | 1 | 1001 | X1 | Y1 |
| Tp4 | MSG_LAT5 | MSG_LONG5 | 34 | 2005 | X2 | Y2 |
| Tp5 | MSG_LAT6 | MSG_LONG6 | 56 | 2134 | X3 | Y3 |
| Tp6 | MSG_LAT7 | MSG_LONG7 | 2 | 1002 | X1 | Y1 |
| Tp7 | MSG_LAT8 | MSG_LONG8 | 343 | 3232 | X4 | Y4 |
| Tp8 | MSG_LAT9 | MSG_LONG9 | 3 | 1003 | X1 | Y1 |
| Tp9 | MSG_LAT10 | MSG_LONG10 | 1 | 1001 | X1 | Y1 |
| Tp10 | MSG_LAT11 | MSG_LONG11 | 3 | 1003 | X1 | Y1 |
| Tp11 | MSG_LAT12 | MSG_LONG12 | 86 | 5313 | X5 | Y5 |
| Tp12 | MSG_LAT13 | MSG_LONG13 | 234 | 1002 | X1 | Y1 |

PAIRED RF LAYER 3 DATA RECORDS – SOURCE RANK 1 (1500)

| | Message Timestamp | Message Latitude | Message Longitude | Signal ID | Sector ID | Transmitter Latitude | Transmitter Longitude |
|---|---|---|---|---|---|---|---|
| 1404 | Tp0 | MSG_LAT1 | MSG_LONG1 | 1 | 1001 | X1 | Y1 |
| 1406 | Tp1 | MSG_LAT2 | MSG_LONG2 | 2 | 1002 | X1 | Y1 |
| 1408 | Tp2 | MSG_LAT3 | MSG_LONG3 | 63 | 1001 | X1 | Y1 |
| 1410 | Tp3 | MSG_LAT4 | MSG_LONG4 | 1 | 1001 | X1 | Y1 |
| 1412 | Tp4 | MSG_LAT5 | MSG_LONG5 | 34 | 2005 | X2 | Y2 |
| 1414 | Tp5 | MSG_LAT6 | MSG_LONG6 | 56 | 2134 | X3 | Y3 |
| 1416 | Tp6 | MSG_LAT7 | MSG_LONG7 | 2 | 1002 | X1 | Y1 |
| 1418 | Tp7 | MSG_LAT8 | MSG_LONG8 | 343 | 3232 | X4 | Y4 |
| 1420 | Tp8 | MSG_LAT9 | MSG_LONG9 | 3 | 1003 | X1 | Y1 |
| 1422 | Tp9 | MSG_LAT10 | MSG_LONG10 | 1 | 1001 | X1 | Y1 |
| 1424 | Tp10 | MSG_LAT11 | MSG_LONG11 | 3 | 1003 | X1 | Y1 |
| 1426 | Tp11 | MSG_LAT12 | MSG_LONG12 | 86 | 5313 | X5 | Y5 |
| | Tp12 | MSG_LAT13 | MSG_LONG13 | 234 | 1002 | X1 | Y1 |

PAIRED RF LAYER 3 DATA RECORDS
DATA GROUPED BY SECTOR ID, TRANSMITTER LATITUDE AND TRANSMITTER LONGITUDE

| Message Timestamp | Message Latitude | Message Longitude | Signal ID | Sector ID | Transmitter Latitude | Transmitter Longitude |
|---|---|---|---|---|---|---|
| Tp0 | MSG_LAT1 | MSG_LONG1 | 1 | 1001 | X1 | Y1 |
| Tp2 | MSG_LAT3 | MSG_LONG3 | 63 | 1001 | X1 | Y1 |
| Tp3 | MSG_LAT4 | MSG_LONG4 | 1 | 1001 | X1 | Y1 |
| Tp9 | MSG_LAT10 | MSG_LONG10 | 1 | 1001 | X1 | Y1 |
| | | | | | | |
| Tp1 | MSG_LAT2 | MSG_LONG2 | 2 | 1002 | X1 | Y1 |
| Tp6 | MSG_LAT7 | MSG_LONG7 | 2 | 1002 | X1 | Y1 |
| Tp12 | MSG_LAT13 | MSG_LONG13 | 234 | 1002 | | |
| | | | | | | |
| Tp8 | MSG_LAT9 | MSG_LONG9 | 3 | 1003 | X1 | Y1 |
| Tp10 | MSG_LAT11 | MSG_LONG11 | 3 | 1003 | X1 | Y1 |

PROCESSED RF LAYER 3 DATA RECORDS
GROUPED DATA, FILTERED AND TAGGED WITH TOWER ID'S — 1700

| Message Timestamp | Message Latitude | Message Longitude | Signal ID | Sector ID | Tower ID | Transmitter Latitude | Transmitter Longitude |
|---|---|---|---|---|---|---|---|
| Tp0 | MSG_LAT1 | MSG_LONG1 | 1 | 1001 | 001 | X1 | Y1 |
| Tp1 | MSG_LAT2 | MSG_LONG2 | 2 | 1002 | 001 | X1 | Y1 |
| Tp8 | MSG_LAT9 | MSG_LONG9 | 3 | 1003 | 001 | X1 | Y1 |

PROCESSED RF LAYER 3 DATA RECORDS
CONSOLIDATED BY TRANSMITTER LATITUDE AND TRANSMITTER LONGITUDE — 1800

| Signal ID List | Sector ID List | Tower ID | Transmitter Latitude | Transmitter Longitude |
|---|---|---|---|---|
| 1, 2, 3 | 1001, 1002, 1003 | 001 | X1 | Y1 |

1802

LOCATION ESTIMATION REPORT — 2600

GEOGRAPHIC AREA 106

| Tower ID | Estimated Latitude | Estimated Longitude | Estimation Source Type |
|---|---|---|---|
| 110 | 40.0° N | 90.8° W | RF LAYER 3 |
| 112 | 42.0° N | 91.2° W | RF LAYER 3 |
| 114 | 41.7° N | 89.3° W | RF LAYER 1 |
| 116 | 42.2° N | 88.5° W | RF LAYER 3 |
| 118 | 40.3° N | 88.8° W | RF LAYER 1 |

METHODS AND APPARATUS FOR CELL TOWER LOCATION ESTIMATION USING MULTIPLE TYPES OF DATA SOURCES

FIELD OF THE DISCLOSURE

This disclosure relates generally to wireless networks, and, more particularly, to methods and apparatus for cell tower location estimation using multiple types of data sources.

BACKGROUND

Wireless networks include cell towers to facilitate communications to and from wireless devices (e.g., cellular phones) operating within a network. The geographic distribution of the cell towers defines a coverage area of the wireless network of a service provider (e.g., Verizon, AT&T, etc.). Accordingly, the respective locations of the cell towers can impact the extent of coverage that subscribers to the network may experience. For example, an adequate number of cell towers distributed throughout an area generally provides for seamless communication by subscribers. However, if the distribution of the cell towers in an area is inadequate, subscribers may experience poor signal quality, dropped calls, and/or may not be able to connect to the wireless network at all.

BRIEF DESCRIPTION OF THE DRAWINGS

FIG. 5 is an illustration of an example data structure containing example data records generated by the example record generator of FIG. 3.

FIG. 7 is an illustration of an example data structure containing example data records generated and/or organized by the example source identifier of FIG. 3.

FIG. 8 is an illustration of alternate example data structures containing example data records generated by and/or organized by the example source identifier of FIG. 3.

FIG. 9 is an illustration of an example data ranking structure utilized, provided and/or generated by the example source ranker of FIG. 3.

FIG. 10 is an illustration of an example data structure containing example data records generated by and/or organized by the example source ranker of FIG. 3.

FIG. 11 is an illustration of alternate example data structures containing example data records generated by and/or organized by the example source ranker of FIG. 3.

FIG. 14 is an illustration of an example data structure containing paired RF Layer 3 data records.

FIG. 15 is an illustration of an example data structure containing paired RF Layer 3 data records that have been processed by the example source ranker of FIG. 3.

FIG. 16 is an illustration of an example data structure containing paired RF Layer 3 data records grouped together by the example data analyzer of FIG. 3.

FIG. 17 is an illustration of an example data structure containing paired, filtered and tagged RF Layer 3 data records generated by the example data analyzer of FIG. 3.

FIG. 18 is an illustration of an example data structure containing an example consolidated RF Layer 3 data record generated by the example data analyzer of FIG. 3.

FIG. 26 is an illustration of an alternate example report that may be generated by the example report generator of FIG. 3.

The figures are not to scale. Wherever possible, the same reference numbers will be used throughout the drawing(s) and accompanying written description to refer to the same or like parts.

DETAILED DESCRIPTION

Figure 1:
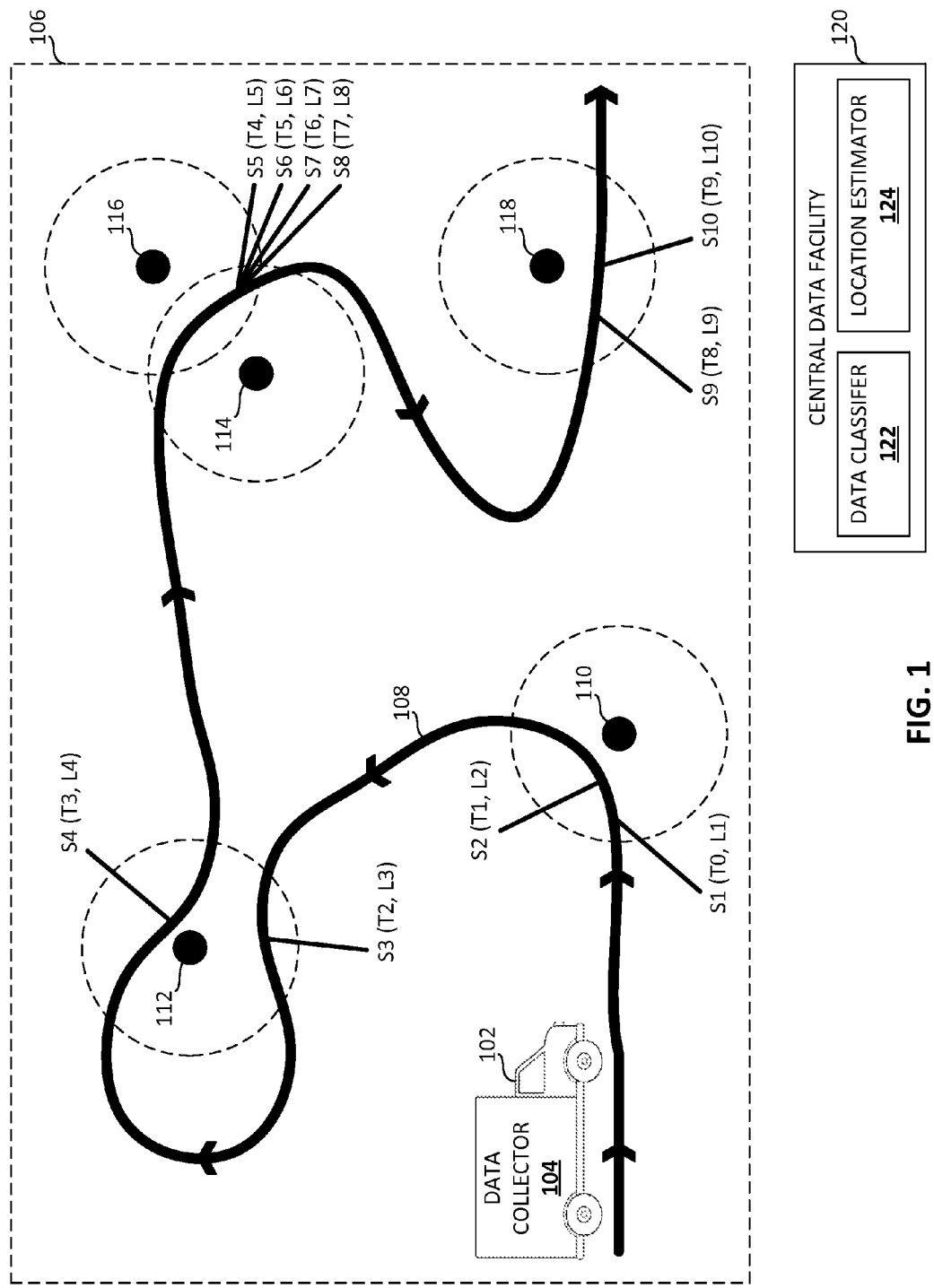
FIG. 1 is an illustration of a path an example data collector constructed in accordance with the teachings of this disclosure may take among example cell towers located within an example area of interest.

While information pertaining to the locations of cell towers residing in a particular service provider's wireless network is valuable, the extent of that value depends largely on the accuracy of the location information. Accurately estimating the locations of cell towers residing in a particular service provider's wireless network, and/or in a particular area of interest, is a difficult task for third-party entities that are not affiliated with the service provider.

While location estimations based on RF Layer 1 data sources (e.g., RF signal power measurements) are readily obtainable by third-party entities utilizing conventional triangulation methodologies, these location estimations may be inaccurate and unpredictable. In some examples, the location estimation errors vary depending on the operational status of the cell tower, and/or are a function of the planning of the wireless network (e.g., infrastructure decisions regarding cell tower locations). For example, it may be more difficult to accurately estimate the location of a cell tower surrounded by mountainous and/or obstructing terrain because such terrain may present difficulties with respect to acquiring data from the cell tower. In such example, the location estimation error may be elevated relative to the location estimation error that might be associated with an unobstructed cell tower.

While more accurate location estimations may be available from alternate sources (e.g., sources other than an RF Layer 1 data source), such alternate sources may in some instances be masked and/or blocked by the service provider such that the alternate sources are unavailable to third-party entities. For example, a service provider may mask and/or block cell tower location information contained in RF Layer 3 signals to prevent a third party (e.g., a competing service provider) from using such information to determine the service provider's network configuration and/or layout. When masking and/or blocking of the alternate data source occurs, the third-party entity attempting to collect data from the alternate sources for the purpose of estimating the locations of cell towers residing in the wireless network (or in a particular area of interest) may end up overlooking or ignoring one or more of the existing cell towers. If cell towers residing in the wireless network and/or in the area of interest are not accounted for in the location estimation process, the location estimation process will result in inaccurate cell tower location estimations for the wireless network and/or for the area of interest as a whole.

Example methods, apparatus and articles of manufacture disclosed herein illustrate how, by utilizing data obtained from different types of data sources, a set of location estimations for cell towers residing in a particular wireless network (or in a particular area of interest) can be generated. The generated set of location estimations exhibit a relatively higher degree of accuracy in comparison to corresponding sets of location estimations that are based on just one type of data source.

In some examples, data collected from a first data source type having a first location estimation accuracy is ranked relative to data collected from a second data source type having a second location estimation accuracy. The ranked data sources are then identified as a higher-ranking data source and a lower-ranking data source. The locations of the cell towers from which the higher-ranking data was collected are then estimated based on the data collected from that source type. If the location of a cell tower residing in the particular wireless network (or in the particular area of interest) is not estimated based on data collected from the higher-ranking data source, the location of any such cell tower is instead estimated based on data collected from the lower-ranking data source. In other words, when the highest ranking data source is insufficient and/or otherwise unavailable, then the next best source of location data is utilized. As explained below, combining the location estimations based on the data collected from the higher-ranking data source with the location estimations based on the data collected from the lower-ranking data source results in a set of location estimations for the cell towers residing in the particular wireless network (or in the particular area of interest) having a higher degree of accuracy in comparison to corresponding sets of location estimations based on just one type of data source.

In some examples, the data collected from the higher-ranking data source includes RF Layer 3 data. As used herein, the terms "RF Layer 3 data," "RF Layer 3 message(s)" and/or "RF Layer 3 signal(s)" refer to any signals, messages and/or information provided, transmitted and/or received via a network communication layer and/or protocol of a wireless network including, without limitation, any signals, messages and/or information pertaining to the structure and management of the network, and/or addressing, routing and/or traffic control within the network. In some examples, the RF Layer 3 data contains the latitude and the longitude of a cell tower transmitter from which an RF Layer 3 signal including the RF Layer 3 data was transmitted.

In some examples, the data collected from the lower-ranking data source includes RF Layer 1 data. As used herein, the terms "RF Layer 1 data," "RF Layer 1 message(s)" and/or "RF Layer 1 signal(s)" refer to any signals, messages and/or information provided, transmitted and/or received via a physical communication layer and/or protocol of a wireless network. In some examples, a triangulation technique is applied to the RF Layer 1 data to identify the estimated location of a cell tower from which RF Layer 1 signals including the RF Layer 1 data were transmitted.

In some examples, data collected from the lower-ranking data source that is associated with respective ones of the cell towers is duplicative of data collected from the higher-ranking data source. In such examples, when the data collected from the higher-ranking data source has already been used to identify an estimated location of a cell tower, the duplicative data collected from the lower-ranking data source is filtered out prior to identifying the estimated location for respective ones of the cell towers based on data collected from the lower-ranking data source.

In some examples, a report of the estimated locations for cell towers residing within an area of interest is generated, the report including the estimated location for respective ones of the cell towers based on data collected from the higher-ranking data source, and further including the estimated location for respective ones of the cell towers based on data collected from the lower-ranking data source.

FIG. 1 is an illustration of an example path 108 that an example mobile unit 102 including an example data collector 104 constructed in accordance with the teachings of this disclosure may take among example cell towers 110, 112, 114, 116, 118 located within an example area of interest 106. In the illustrated example of FIG. 1, as the example mobile unit 102 travels along the example path 108, the example data collector 104 may collect signals including data and/or messages from the cell towers 110, 112, 114, 116, 118. As discussed below in connection with FIG. 3, the example data collector 104 generates data records based on the signals that the data collector 104 collects from the cell towers 110, 112, 114, 116, 118.

In the illustrated example of FIG. 1, the example mobile unit 102 is a motorized vehicle (e.g., a truck) that can be driven throughout the example area of interest 106. In the illustrated example, the example data collector 104 contained within the example mobile unit 102 may include computing equipment (e.g., one or more servers, computers, storage devices, processors, chipsets, and/or other hardware components) used to collect, process and/or store signals received and/or otherwise retrieved from cell towers located within the example area of interest 106. The example mobile unit 102 and/or the example data collector 104 may alternatively take on any form and/or structure so long as the form and/or structure permits the example mobile unit 102, including the example data collector 104, to be maneuvered about the example area of interest 106. For example, the mobile unit 102 may alternatively be a smartphone, tablet computer and/or other mobile computing device that houses (e.g., acts as a vehicle for transporting) the example data collector 104, which may take the form of one or more hardware components located within the smartphone, tablet computer, and/or other mobile computing device.

In the illustrated example of FIG. 1, an example central data facility 120 including an example data classifier 122 and an example location estimator 124 receives and/or and or otherwise retrieves the data records generated by the example data collector 104. As described below in connection with FIG. 3, the example data classifier 122 and the example location estimator 124 of the example central data facility 120 process the received data records generated by the example data collector 104 to determine the locations of the example cell towers 110, 112, 114, 116, 118 located within the example area of interest 106. The example central data facility 120, including any components and/or subsystems thereof, may be implemented using either a single computing system or multiple computing systems, and may be implemented using either a centralized computer architecture or a distributed computer architecture. The example central data facility 120 can be implemented within, for example, one or more of a server, a personal computer, and/or any other type of computing device.

While the example data classifier 122, the example location estimator 124, and/or the example central data facility 120 are shown in FIG. 1 as being located outside of the example area of interest 106, any of the example data classifier 122, the example location estimator 124, and/or the example central data facility 120 may alternatively be located within the example area of interest 106. Furthermore, any of the example data classifier 122, the example location estimator 124, and/or the example central data facility 120 may alternatively be located within the example mobile unit 102 such that additional portions and/or the entirety of the example central data facility 120 is mobile and/or transportable along with the mobile unit 102.

In the illustrated example of FIG. 1, the example area of interest 106 may be a geographic area of any size, shape and/or configuration, including for example, a zip code, a neighborhood, a town, a city, a region, or a state. The example area of interest 106 may include any number of cell towers. An example configuration of cell towers located within the example area of interest 106 is described below in connection with FIG. 2. Cell towers residing within the example area of interest 106 may have any configuration with respect to the number of coverage sectors and/or transmitters from which signals including data and/or messages may be transmitted. Moreover, each transmitter associated with a cell tower residing within the example area of interest 106 may transmit signals of any form. For example, the transmitted signals may include RF Layer 1 data and/or messages, RF Layer 3 data and/or messages, and/or other types of data and/or messages that the transmitter of the cell tower is capable of transmitting.

In some examples, signals including RF Layer 3-type data and/or messages will be unavailable from one or more of the cell towers residing within the example area of interest 106, either due to the cell tower blocking its RF Layer 3 signal transmissions, or due to the cell tower transmitting signals including RF Layer 3 data and/or messages in a manner such that the information from within those signals that would be of value for the purpose of estimating the location of the cell tower has been masked. For example, a service provider may desire to maintain the configuration and/or layout of its network as confidential and/or proprietary information. Thus, the service provider may mask and/or block cell tower location information contained in RF Layer 3 signals to prevent a third party (e.g., a competing service provider) from using such information to determine the service provider's network configuration and/or layout.

In the illustrated example of FIG. 1, the example data collection path 108 located within the example area of interest 106 may take on any form, including, without limitation, alternate and/or additional forms that are more complex than and/or redundant of the example path 108 illustrated in FIG. 1. Typically, the complexity and/or form of the example data collection path 108 will be based on the size and/or shape of the example area of interest 106, the available geographic pathways (e.g., street arrangements) within the example area of interest 106, and/or the volume of data samples that must be obtained by the example data collector 104 in order to accurately estimate the locations of the cell towers residing within the example area of interest 106.

In the illustrated example of FIG. 1, as the example data collector 104 housed within the example mobile unit 102 travels along the example data collection path 108, the data collector 104 receives and/or otherwise retrieves signals including data and/or messages associated with the example cell towers 110, 112, 114, 116, 118. For example, the data collector 104 receives and/or otherwise retrieves a first signal "S1" from cell tower 110 at a time "T0." At time "T0," the example data collector 104 also detects a location "L1" at which the signal "S1" was received and/or otherwise retrieved by the data collector 104. Thus, the location "L1" is based on the location of the example data collector 104, as opposed to being based on and/or derived from any location information that may be embedded in the data and/or messages of the example signal "S1." Continuing along the example data collection path 108, the example data collector 104 receives and/or otherwise retrieves a second signal "S2" from cell tower 110 at time "T1" and location "L2." As described below in connection with FIGS. 5 and/or 13, in some examples the second signal "S2" may be an RF Layer 3 signal including a SYSTEM PARAMETERS message that can be associated and/or paired with the example first signal "S1" that may be an RF Layer 3 signal including a SYNC message.

Continuing along the example data collection path 108, the example data collector 104 receives and/or otherwise retrieves a third signal "S3" from cell tower 112 at time "T2" and location "L3," and also receives and/or otherwise retrieves a fourth signal "S4" from cell tower 112 at time "T3" and location "L4." In the illustrated example of FIG. 1, the signals "S1" and "S2" collected from cell tower 110 may be of a different type than the signals "S3" and "S4" collected from cell tower 112. For example, signals "S1" and "S2" may be RF Layer 3 signals, while signals "S3" and "S4" may be RF Layer 1 signals. In the illustrated example of FIG. 1, cell tower 112 may not transmit any RF Layer 3 signals as a result of RF Layer 3 masking and/or blocking implemented by and/or in connection with cell tower 112.

Continuing along the example data collection path 108, the example data collector 104 receives and/or otherwise retrieves a fifth signal "S5" and a sixth signal "S6" from cell tower 114 at respective times "T4" and "T5" and respective locations "L5" and "L6." The example data collector 104 also receives and/or otherwise retrieves a seventh signal "S7" and an eighth signal "S8" from cell tower 116 at respective times "T6" and "T7" and respective locations "L7" and "L8." In the illustrated example, the respective times "T4" and "T5" and the respective locations "L5 and "L6" at which the example data collector 104 receives signals "S5" and "S6" from cell tower 114 are nearly identical to the respective times "T6" and "T7" and the respective locations "L7 and "L8" at which the example data collector 104 receives signals "S7" and "S8" from cell tower 116. The configuration and/or distribution (e.g., the overlapping coverage areas) of cell towers 114 and 116 is described below in connection with FIG. 2.

Continuing along the example data collection path 108, the example data collector 104 receives and/or otherwise retrieves a ninth signal "S9" from cell tower 118 at time "T8" and location "L9," and also receives and/or otherwise retrieves a tenth signal "S10" from cell tower 118 at time "T9" and location "L10." In the illustrated example of FIG. 1, the signals "S9" and "S10" collected from cell tower 118 may be of the same type as the signals "S1" and "S2" collected from cell tower 110. For example, signals "S1," "S2," "S9" and "S10" may all be RF Layer 3 signals.

While the example scenario illustrated and described above in connection with FIG. 1 involves a relatively small number of received and/or retrieved signals, a substantially larger number of signals will typically be received and/or retrieved by the example data collector 104 while the example data collector 104 and the example mobile unit 102 is maneuvered about the example area of interest 106. In some examples, the degree of accuracy with which the locations of the cell towers residing within an area of interest are estimated may depend upon a substantially large number of signals being collected throughout the area of interest. Accordingly, relatively higher volumes of signal data collected by the example data collector 104 may yield an improved accuracy with respect to the location estimations provided by the example central data facility 120.

Figure 2:
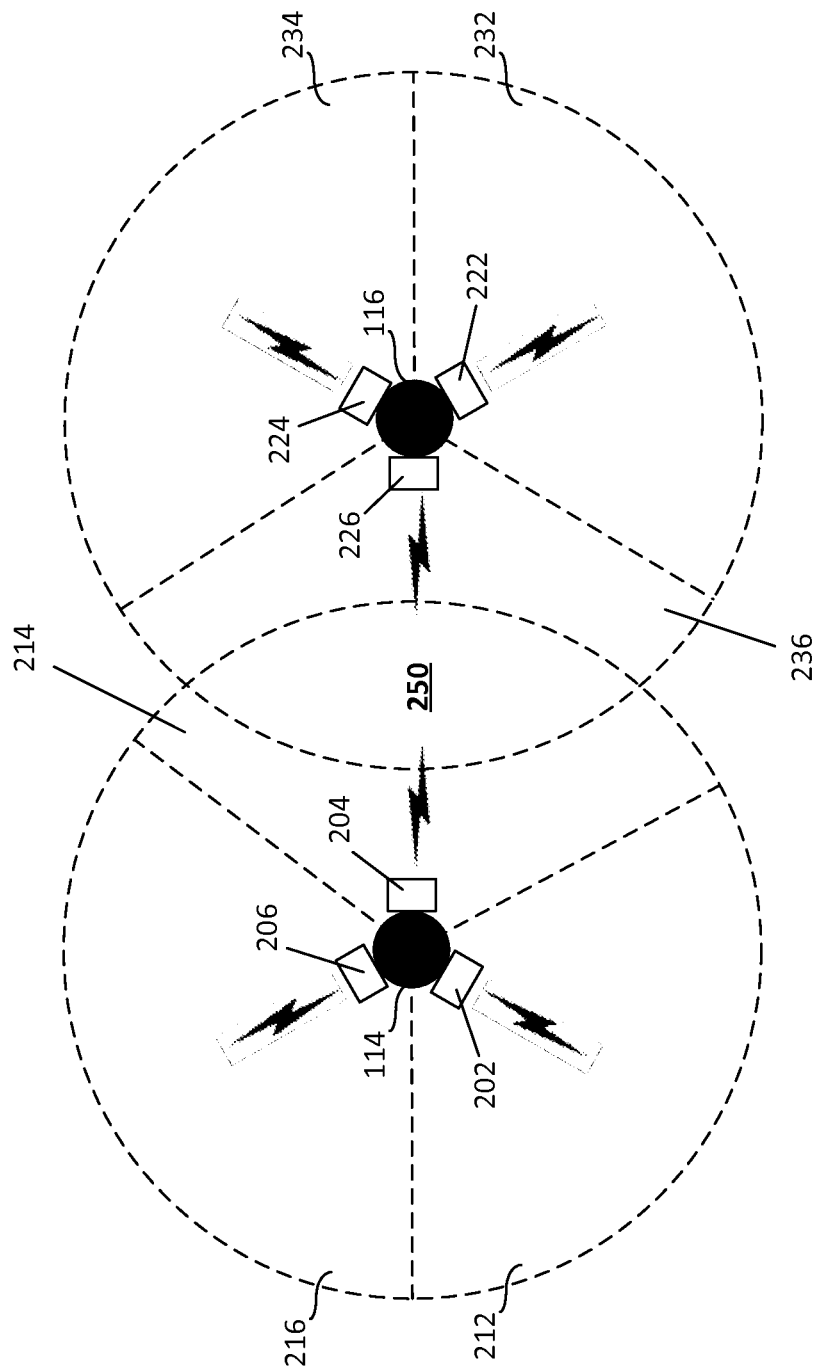
FIG. 2 is an illustration showing coverage sectors of example cell towers from which data and/or messages in the form of signals may be received and/or otherwise retrieved.

FIG. 2 is an illustration showing example coverage sectors 212, 214, 216 of the example cell tower 114 (FIG. 1) and example coverage sectors 232, 234, 236 of the example cell tower 116 (FIG. 1). In the illustrated example of FIG. 2, the example cell tower 114 includes example transmitters 202, 204, 206, each of which transmits signals including data and/or messages into corresponding ones of the example coverage sectors 212, 214, 216. Similarly, the example cell tower 116 includes example transmitters 222, 224, 226, each of which transmits signals including data and/or messages into corresponding ones of the example coverage sectors 232, 234, 236. A coverage sector (e.g., the example coverage sector 212) is a virtual way to view the area of coverage provided by a corresponding transmitter of a cell tower (e.g., the example transmitter 202 of the example cell tower 114). The signals that are transmitted by the example transmitters 202, 204, 206 of the example cell tower 114 and/or by the example transmitters 222, 224, 226 of the example cell tower 116 may include RF Layer 1 data and/or messages, RF Layer 3 data and/or messages, and/or other types of data and/or messages that the transmitters are capable of transmitting. For example, the example transmitters 202, 204, 206 of the example cell tower 114 may transmit RF Layer 1 signals as well as RF Layer 3 signals, while the example transmitters 222, 224, 226 of the example cell tower 116 may only transmit RF Layer 1 signals.

In some examples, the data and/or messages included in a transmitted signal may include a signal identifier (Signal ID) such as, for example, a pseudo-noise code (PN code), a scrambling code (SC code), or a physical cell identity (PCI). The example Signal ID is associated with the transmitter of the cell tower from which a signal including data and/or a message containing the Signal ID was transmitted. In some examples, the data and/or messages included in a transmitted signal may include a Signal Power measurement. The example Signal Power measurement may be associated with a relative distance between the location of the cell tower transmitter from which the signal including the Signal Power measurement was transmitted and the location at which the transmitted signal was received by the example data collector 104 of FIG. 1.

In the illustrated example of FIGS. 1 and 2, signals transmitted by the example cell towers 114, 116 may be received and/or otherwise retrieved by the example data collector 104 of FIG. 1 when the data collector 104 is located within a corresponding coverage sector 212, 214, 216 of the example cell tower 114 and/or a corresponding coverage sector 232, 234, 236 of the example cell tower 116. For example, if the data collector 104 is located within the example coverage sector 214 of the example cell tower 114, the data collector 104 may receive signals of any type and/or form that are being transmitted by the example transmitter 204 of the example cell tower 114 that is associated with the example coverage sector 214. Based on the relative proximity between the data collector 104 and the example cell tower 114, the data collector 104, when located within coverage sector 214, may also receive signals that are being transmitted by the other example transmitters 202 and 206 of the example cell tower 114 that are associated with example coverage sectors 212 and 216.

In the illustrated example of FIG. 2, the example 236 of the example cell tower 116 overlaps with the example coverage sector 214 of the example cell tower 114, as shown at reference number 250. If the example data collector 104 of FIG. 1 is located within the example overlapping area 250 of the example coverage sectors 214, 236, the data collector 104 may receive signals of any type and/or form that are being transmitted by the example transmitter 204 of the example cell tower 114 that is associated with the example coverage sector 214, or the example transmitter 226 of the example cell tower 116 that is associated with the example coverage sector 236. For example, the example signals "S5," "S6," "S7" and "S8" transmitted by the example cell towers 114, 116 described above in connection with FIG. 1 may be received and/or otherwise retrieved by the example data collector 104 at a location within an overlapping coverage area of the example cell towers 114, 116, such as the example overlapping area 250 shown in FIG. 2.

While both of the example cell towers 114, 116 of FIG. 2 are illustrated as having three coverage sectors, the example data collector 104 of FIG. 1 may collect signals including data and/or messages from cell towers having any number of coverage sectors. Moreover, one or more coverage sectors of any cell tower may or may not overlap with one more coverage sectors of another cell tower residing within an area of interest. The example data collector 104 of FIG. 1 is constructed to collect signals including data and/or messages from cell towers residing within an area of interest, regardless of the relative distribution of the cell towers residing within the area of interest, and regardless of the number of transmitters and/or coverage sectors that any cell tower(s) residing within the area of interest may contain. In some examples, a signal that a transmitter of a cell tower (e.g., the example cell tower 110 of FIG. 1) transmits to the example data collector 104 is intended to be transmitted specifically to the example data collector 104 based on the data collector 104 first contacting the example cell tower and requesting and/or otherwise prompting the transmission of the signal from the cell tower to the data collector 104. In other examples, the example data collector 104 may collect a signal that a transmitter of a cell tower transmits even if the signal is not intended to be transmitted specifically to the example data collector 104.

Figure 3:
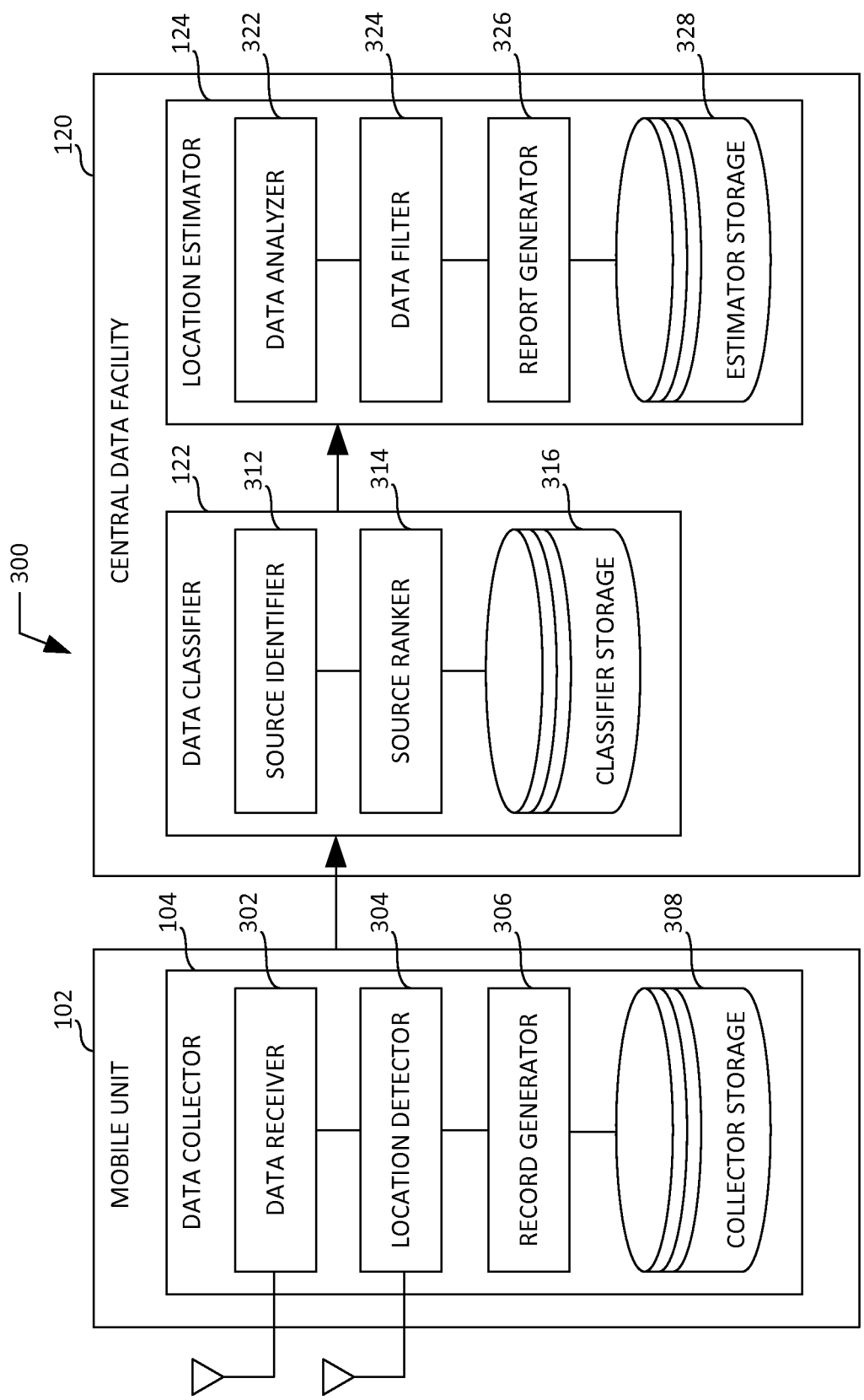
FIG. 3 is a block diagram of an example location estimation system constructed in accordance with the teachings of this disclosure for estimating, based on multiple types of data sources, the locations of cell towers residing within an area of interest.

FIG. 3 is a block diagram of an example location estimation system 300 constructed in accordance with the teachings of this disclosure for estimating, based on multiple types of data sources, the locations of the example cell towers 110, 112, 114, 116, 118 residing within the example area of interest 106 of FIG. 1. The example location estimation system 300, including any components and/or subsystems thereof, may be implemented using either a single computing system or multiple computing systems, and may be implemented using either a centralized computer architecture or a distributed computer architecture. The example location estimation system 300 can be implemented within, for example, one or more of a server, a personal computer, or any other type of computing device.

In the illustrated example of FIG. 3, the example location estimation system 300 includes the example mobile unit 102 having the example data collector 104 of FIGS. 1 and/or 3. In the illustrated example of FIG. 3, the example data collector 104 includes an example data receiver 302, an example location detector 304, an example record generator 306 and an example collector storage 308. The example location estimation system 300 further includes the example central data facility 120 having the example data classifier 122 and the example location estimator 124 of FIGS. 1 and/or 3. In the illustrated example of FIG. 3, the example data classifier 122 includes an example source identifier 312, an example source ranker 314 and an example classifier storage 316. In the illustrated example of FIG. 3, the example location estimator 124 includes an example data analyzer 322, an example data filter 324, an example report generator 326 and an example estimator storage 328. However, fewer or additional structures may be implemented to carry out one or more portions of the functionalities implemented by the example data collector 104, the example data classifier 122, the example location estimator 124, and/or other structures associated with one or more additional and/or alternative functions described herein.

In the illustrated example of FIG. 3, the example data collector 104 combines the signal data received and/or otherwise retrieved by the example data receiver 302 with location data received and/or otherwise retrieved by the example location detector 304. The example record generator 306 generates one or more example data records associated with the combined data, and the example data records are stored in the example collector storage 308 of the data collector 104. As described in greater detail below, the example data records are transmitted to and/or made accessible to the example data classifier 122 and/or the example location estimator 124 of FIGS. 1 and/or 3 for further processing.

In the illustrated example of FIG. 3, as the example mobile unit 102 and the example data collector 104 is transported through an area of interest (e.g., the example area of interest 106 of FIG. 1), the example data receiver 302 of the data collector 104 receives and/or otherwise retrieves signals including data and/or messages from one or more cell towers (e.g., the example cell towers 110, 112, 114, 116, 118 of FIG. 1) residing in the area of interest. The example data receiver 302 associates a timestamp with each signal that the data receiver 302 receives and/or otherwise retrieves. In some examples, the associated timestamp may be based on the time at which the signal is received and/or otherwise retrieved by the data receiver 302. Alternatively, the associated timestamp may be based on information contained within and/or represented by the signal itself.

In the illustrated example of FIG. 3, the example location detector 304 is a global positioning system (GPS) receiver that detects the location at which signals transmitted by one or more example cell towers (e.g., the example cell towers 110, 112, 114, 116, 118 of FIG. 1) residing within an example area of interest (e.g., the example area of interest 106 of FIG. 1) are received and/or otherwise retrieved by the example data receiver 302. In some examples, the timestamp that the example data receiver 302 associates with a received signal is synchronized to a timestamp that the example location detector 304 associates with received location data. In other examples, location data received and/or otherwise retrieved by the example location detector 304 is directly associated with a signal that is received and/or otherwise retrieved by the example data receiver 302 at the time such signal is received and/or otherwise retrieved, in which case the location data will share the same timestamp that the example data receiver 302 associates with the receipt of the signal without the need for synchronization.

In the illustrated example of FIG. 3, the example record generator 306 generates a data record associated with each signal that is received and/or retrieved by the example data receiver 302 for which the example location detector 304 has provided location data associated with the location at which the signal was received and/or retrieved by the data receiver 302. In some examples, the generated data record may include the timestamp at which the example data receiver 302 received and/or otherwise retrieved the signal. The example data record may also include the location data received and/or otherwise retrieved by the example location detector 304 that is associated with the received signal. The example data record may also include a Signal ID associated with a transmitter of the cell tower from which the signal containing the Signal ID was transmitted. The example data record may also include additional data representing and/or from portions of the associated signal. Example data records generated by the example record generator 306 of FIG. 3 are described in further detail below in connection with FIG. 5.

In the illustrated example of FIG. 3, data records and/or data structures that are generated by the example record generator 306 are stored in the example collector storage 308. The example collector storage 308 of FIG. 3 is implemented by one or more hard disk drives, but it could additionally or alternatively be implemented by any type and/or any number of a storage drive, a storage disk, a flash memory, a read-only memory (ROM), a compact disk (CD), a digital versatile disk (DVD), a Blu-ray disc, a cache, a random-access memory (RAM) and/or any other storage medium in which information is stored for any duration (e.g., for extended time periods, permanently, brief instances, for temporarily buffering, and/or for caching of the information). Data records and/or data structures that are generated by the example record generator 306 and stored in the example collector storage 308 may be stored in any file format, organization scheme and/or arrangement, including without limitation an arrangement corresponding to the example data structure described below in connection with FIG. 5. For example, each data record that is stored in the example collector storage 308 may be stored as an individual file, or may alternatively be aggregated into a single stored file and/or stored data structure that contains multiple data records. As described in greater detail herein, the data records and/or data structures that are stored in the example collector storage 308 will be accessible to one or more of the example data classifier 122, the example location estimator 124, and/or, more generally, to the example central data facility 120 of the example location estimation system 300 of FIG. 3.

In the illustrated example of FIG. 3, the example data classifier 122 includes an example source identifier 312, an example source ranker 314 and an example classifier storage 316. The data classifier 122 classifies, associates, modifies and/or organizes the example data records that have been generated by the example record generator 306 and/or stored in the example collector storage 308 such that a source type and/or a source rank is assigned to and/or otherwise associated with each example data record. As described in greater detail herein, the example data records, after having been classified, associated, modified and/or otherwise organized by the example data classifier 122, are transmitted to and/or made accessible to the example location estimator 124 of FIG. 3 for further processing.

In the illustrated example of FIG. 3, the example source identifier 312 identifies, assigns and/or otherwise associates a source type with respective ones of the example data records that are generated by the example record generator 306 and/or stored in the example collector storage 308. For example, the example source identifier 312 may identify a data record that includes RF Layer 3 signal data as being an RF Layer 3 data record, because the RF Layer 3 signal was transmitted by an RF Layer 3 data source (e.g., the example cell tower 110 of FIG. 1 that transmits RF Layer 3 signals). Example data records and/or data structures that have been processed and/or generated by the example source identifier 312 of FIG. 3 are described in further detail below in connection with FIGS. 7 and 8.

In the illustrated example of FIG. 3, the example source ranker 314 identifies, assigns and/or otherwise associates a source rank with the example data records and/or data structures that have been processed and/or generated by the example source identifier 312. The example source ranker 314 determines a source rank to be associated with an example data record based on the type of source from which the example data record was generated and a relative accuracy associated with that type of source. In some examples, an associated accuracy of each source type is predetermined, known by and/or otherwise provided to the example source ranker 314.

For example, the example source ranker 314 may associate an example RF Layer 3 source with a high degree of accuracy, because signals received and/or otherwise retrieved from an RF Layer 3 source contain information from which the actual latitude and longitude of a cell tower and/or its transmitters can be identified. In contrast, the example source ranker 314 may associate an example RF Layer 1 source with a relatively lower degree of accuracy, because signals received and/or otherwise retrieved from an RF Layer 1 source do not contain information from which the actual latitude and longitude of a cell tower and/or its transmitters can be identified. Instead, the example RF Layer 1 signals contain information from which a location of a cell tower can be estimated, for example, via triangulation techniques. Such estimation processes may carry a relatively greater degree of risk for location error as compared to using the RF Layer 3-based estimation processes described herein.

Based on the relative accuracy associated with respective ones of the available source types, the example source ranker 314 of FIG. 3 defines, assigns and/or otherwise associates a source rank with each source type. For example, the source ranker 314 may assign a rank of "1" to an example RF Layer 3 source type and a rank of "2" to an example RF Layer 1 source type, as the example RF Layer 3 source type has an associated accuracy that is more effective, relative to the associated accuracy of the RF Layer 1 source type with respect to estimating the location of a cell tower. As such, the example source ranker 314 has identified and/or ranked the example RF Layer 3 source type as a higher-ranking source (rank 1), and the example RF Layer 1 source type 1004 as a lower-ranking source (rank 2). An example data ranking structure utilized, provided and/or generated by the example source ranker 314 of FIG. 3 is described below in connection with FIG. 9.

While the example source ranker 314 described above in connection with FIG. 3 may rank as few as two source types, the source ranker 314 can rank any number of source types. For example, the source ranker 314 may further rank a third source type having an associated accuracy that is higher and/or lower relative to the associated accuracy of the example RF Layer 1 source type and/or the example RF Layer 3 source type. For example, the third source type may take the form of satellite imagery from which the locations of cell towers residing within an example area of interest can be estimated with a medium degree of accuracy. In such an instance, the source ranker 314 would assign a source rank to the example satellite imagery source type that is lower relative to the source rank assigned to the example RF Layer 3 source type (rank "1"), but higher relative to the source rank assigned to the example RF Layer 1 source type (rank "2"). For example, the source ranker 314 may assign a rank of "1.5" to the example satellite imagery source type. Alternatively, the source ranker 314 may assign a source rank of "2" to the example satellite imagery source type, and assign and/or reassign a source rank of "3" to the example RF Layer 1 source type.

Once the example source ranker 314 of FIG. 3 has associated respective source ranks with corresponding source types, the source ranker 314 identifies, assigns and/or otherwise associates a source rank with respective ones of the example data records that have been processed by the example source identifier 312. For example, if the example source ranker 314 has associated a source rank of "1" with the RF Layer 3 source type, the example source ranker 314 may assign a source rank of "1" to an example data record that the example source identifier 312 has identified as being an RF Layer 3 data record. Example data records and/or data structures that have been processed and/or generated by the example source ranker 314 of FIG. 3 are described in further detail below in connection with FIGS. 10 and 11.

The example data records and/or data structures that are utilized, processed and/or generated by the example source identifier 312 and/or the example source ranker 314 are stored in the example classifier storage 316 of FIG. 3. The example classifier storage 316 of FIG. 3 is implemented by one or more hard disk drives, but it could additionally or alternatively be implemented by any type and/or any number of a storage drive, a storage disk, a flash memory, a read-only memory (ROM), a compact disk (CD), a digital versatile disk (DVD), a Blu-ray disc, a cache, a random-access memory (RAM) and/or any other storage medium in which information is stored for any duration (e.g., for extended time periods, permanently, brief instances, for temporarily buffering, and/or for caching of the information). Data records and/or data structures that are stored in the example classifier storage 316 may be stored in any file format, organization scheme and/or arrangement, including without limitation an arrangement corresponding to the example data structures described below in connection with FIGS. 7-11. For example, each data record that is stored in the example classifier storage 316 may be stored as an individual file, or may alternatively be aggregated into a single stored file and/or stored data structure that contains multiple data records. As described in greater detail herein, the data records and/or data structures that are stored in the example classifier storage 316 will be accessible to the source ranker 314, and/or, more generally to the example data classifier 122 of FIG. 3, and/or to the example location estimator 124, and/or, more generally, to the example central data facility 120 of the example location estimation system 300 of FIG. 3.

The example location estimator 124 of FIG. 1 includes an example data analyzer 322, an example data filter 324, an example report generator 326 and an example estimator storage 328. The location estimator 124 estimates the locations of cell towers (e.g., the example cell towers 110, 112, 114, 116, 118 of FIG. 1) residing in an area of interest (e.g., the example area of interest 106 of FIG. 1) from which the example data collector 104 of FIGS. 1 and/or 3 has collected data, subsequent to such collected data having first been processed by the example data classifier 122 of FIGS. 1 and/or 3. As described in greater detail below, the example location estimator 124 processes the example data records and/or data structures generated by the example source ranker 314 in an incremental manner, beginning with the highest-ranking data records and/or data structures, based on the source ranks that the example source ranker 314 has assigned to such example data records and/or data structures.

In the illustrated example of FIG. 3, the example data analyzer 322 processes the data records and/or data structures generated by the example source ranker 314 and/or stored in the example classifier storage 316 in an incremental manner. The example data analyzer 322 first identifies (for example, via a query) the one or more source rankings that the example source ranker 314 has associated with the data records and/or data structures. The example data analyzer 322 then selects (for example, via a query) for processing only those data records and/or data structures associated with the highest-ranking source for which the data analyzer 322 has not conducted processing. For example, if the example data analyzer 322 determines that source rank "1" RF Layer 3 data records and source rank "2" RF Layer 1 data records are available for processing, the data analyzer 322 will recognize that source rank "1" is the highest-ranking source that is available for processing, and the data analyzer 322 will accordingly select only the source rank "1" RF Layer 3 data records for processing. Once the example data analyzer 322 has processed the example source rank "1" RF Layer 3 data records, the data analyzer 322 will then proceed with processing the data records associated with the next incrementally lower-ranking source (e.g., the example source rank "2" RF Layer 1 data records). The example data analyzer 322 continues with this incremental processing technique until the data records and/or data structures associated with the lowest-ranking source have been processed.

The example data analyzer 322 of FIG. 3, subsequent to selecting a set of data records and/or data structures associated with a particular source rank (e.g., RF Layer 3 data records associated with source rank "1"), processes the selected data records and/or data structures to estimate the locations of the cell towers of that type of source rank (e.g., cell towers 110, 114 and 118 of FIG. 1 that transmit RF Layer 3 signals) residing in an area of interest (e.g., the example area of interest 106 of FIG. 1). An example of the manner in which the example data analyzer 322 processes a set of RF Layer 3 data records and/or data structures to estimate the locations of cell towers transmitting RF Layer 3 signals is described below in connection with FIGS. 12-19. An example of the manner in which the example data analyzer 322 processes RF Layer 1 data records to estimate the locations of cell towers transmitting RF Layer 1 signals is described below in connection with FIG. 20.

In the illustrated example of FIG. 3, prior to and/or in conjunction with the example data analyzer 322 processing lower-ranking data records and/or data structures, the example data filter 324 first filters out any data from the lower-ranking data records and/or data structures that is associated with a cell tower for which the example data analyzer 322 and/or the example location estimator 124 has already generated an estimated location. In other words, duplicative information is identified and removed from consideration. As such, processing resources may be conserved and/or otherwise saved that would otherwise be consumed by processing one or more types of data that is duplicative of data that has already been considered.

In the illustrated example of FIG. 3, the example data filter 324 assists with the incremental processing performed by the example data analyzer 322 by removing data from lower-ranking data records and/or data structures that is duplicative and/or redundant of data from higher-ranking data records and/or structures that the example data analyzer 322 has already processed. For example, if the example data analyzer 322 and/or the example location estimator 124 of FIG. 3 has generated a first estimated location for a particular cell tower residing within an area of interest based on higher-ranking RF Layer 3 data records and/or data structures, it may be disadvantageous for the example data analyzer 322 and/or the example location estimator 124 to subsequently generate a second estimated location for that particular cell tower based on lower-ranking RF Layer 1 data records and/or data structures, as the second estimated location would be duplicative and/or redundant of, but less accurate than, the first estimated location. Such adverse duplication scenarios are avoided by implementation of the example data filter 324.

In some examples, the example data filter 324 first identifies lower-ranking data records having Signal IDs that match the Signal IDs of higher-ranking data records associated with a particular cell tower for which the example data analyzer 322 and/or the example location estimator 124 has already generated an estimated location. Once the example data filter 324 has identified the lower-ranking data records based on the aforementioned matching Signal ID criteria, the data filter 324 then removes respective ones of the identified lower-ranking data records if the location at which the signal and/or message associated with the lower-ranking data record was received and/or otherwise retrieved by the example data collector 104 is within a threshold distance (e.g., one mile) of the estimated location of the cell tower transmitter having the matching Signal ID for which higher-ranking data records have already been utilized to estimate a location. An example of the manner in which the example data filter 324 filters lower-ranking RF Layer 1 data records that are duplicative of higher-ranking RF Layer 3 data records is described in further detail below in connection with FIGS. 19 and 21-24.

In the illustrated example of FIG. 3, after the example data analyzer 322 and/or the example location estimator 124 has generated location estimations for the cell towers (e.g., the example cell towers 110, 112, 114, 116, 118 of FIG. 1) residing in an area of interest (e.g., the example area of interest 106 of FIG. 1), the example report generator 326 generates one or more reports associated with the location estimations. In some examples, a report generated by the example report generator 326 includes the location estimations for the cell towers based on data collected from a higher-ranking data source, such as an RF Layer 3 data source, and also includes the location estimations for the cell towers based on data collected from a lower-ranking data source, such as an RF Layer 1 data source. Example reports generated by the example report generator 326 of FIG. 3 are described below in connection with FIGS. 25-26.

The example data records, data structures and/or reports that are processed and/or generated by the example data analyzer 322, the example data filter 324, and/or the example report generator 326 are stored in the example estimator storage 328 of FIG. 3. The example estimator storage 328 of FIG. 3 is implemented by one or more hard disk drives, but it could additionally or alternatively be implemented by any type and/or any number of a storage drive, a storage disk, a flash memory, a read-only memory (ROM), a compact disk (CD), a digital versatile disk (DVD), a Blu-ray disc, a cache, a random-access memory (RAM) and/or any other storage medium in which information is stored for any duration (e.g., for extended time periods, permanently, brief instances, for temporarily buffering, and/or for caching of the information). The data records, data structures and/or reports that are stored in the example estimator storage 328 may be stored in any file format, organization scheme and/or arrangement, including without limitation an arrangement corresponding to the example data records, data structures and/or reports described below in connection with FIGS. 14-18 and 25-26. The data records, data structures and/or reports that are stored in the example estimator storage 328 will be accessible to one or more of the example data analyzer 322, the example data filter 324, the example report generator 326 and/or, more generally, the example location estimator 124 of FIG. 3.

In the example of FIG. 3, the collector storage 308, the example classifier storage 316 and the example estimator storage 328 are illustrated as being separate storage devices, with the example classifier storage 316 and the example estimator storage 328 being commonly located at the example central data facility 120. The example collector storage 308, the example classifier storage 316 and/or the example estimator storage 328 may alternatively be a single shared and/or partitioned storage device and/or storage disk to which data records, data structures and/or reports generated and/or processed by any of the example record generator 306, the example source identifier 312, the example source ranker 314, the example data analyzer 322, the example data filter 326 and/or the example report generator 326 may be stored.

While an example manner of implementing the example location estimation system 300 is illustrated in FIG. 3, one or more of the elements, processes and/or devices illustrated in FIG. 3 may be combined, divided, re-arranged, omitted, eliminated and/or implemented in any other way. Further, the example data receiver 302, the example location detector 304, the example record generator 306, the example collector storage 308, the example source identifier 312, the example source ranker 314, the example classifier storage 316, the example data analyzer 322, the example data filter 324, the example report generator 326, the example estimator storage 328, and/or, more generally, the example data collector 104, the example data classifier 122, the example location estimator 124, and/or, more generally, the example mobile unit 102, the example central data facility 120, and/or, more generally, the example location estimation system 300 of FIG. 3 may be implemented by hardware, software, firmware and/or any combination of hardware, software and/or firmware. Thus, for example, any of the example data receiver 302, the example location detector 304, the example record generator 306, the example collector storage 308, the example source identifier 312, the example source ranker 314, the example classifier storage 316, the example data analyzer 322, the example data filter 324, the example report generator 326, the example estimator storage 328, and/or, more generally, the example data collector 104, the example data classifier 122, the example location estimator 124, and/or, more generally, the example mobile unit 102, the example central data facility 120, and/or, more generally, the example location estimation system 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data receiver 302, the example location detector 304, the example record generator 306, the example collector storage 308, the example source identifier 312, the example source ranker 314, the example classifier storage 316, the example data analyzer 322, the example report generator 326, the example estimator storage 328, and/or, more generally, the example data collector 104, the example data classifier 122, the example location estimator 124, and/or, more generally, the example mobile unit 102, the example central data facility 120, and/or, more generally, the example location estimation system 300 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example location estimation system 300 of FIG. 3 may include one or more elements, processes and/or devices in addition to, or instead of, those illustrated in FIG. 3, and/or may include more than one of any or all of the illustrated elements, processes and devices.

Figure 4:
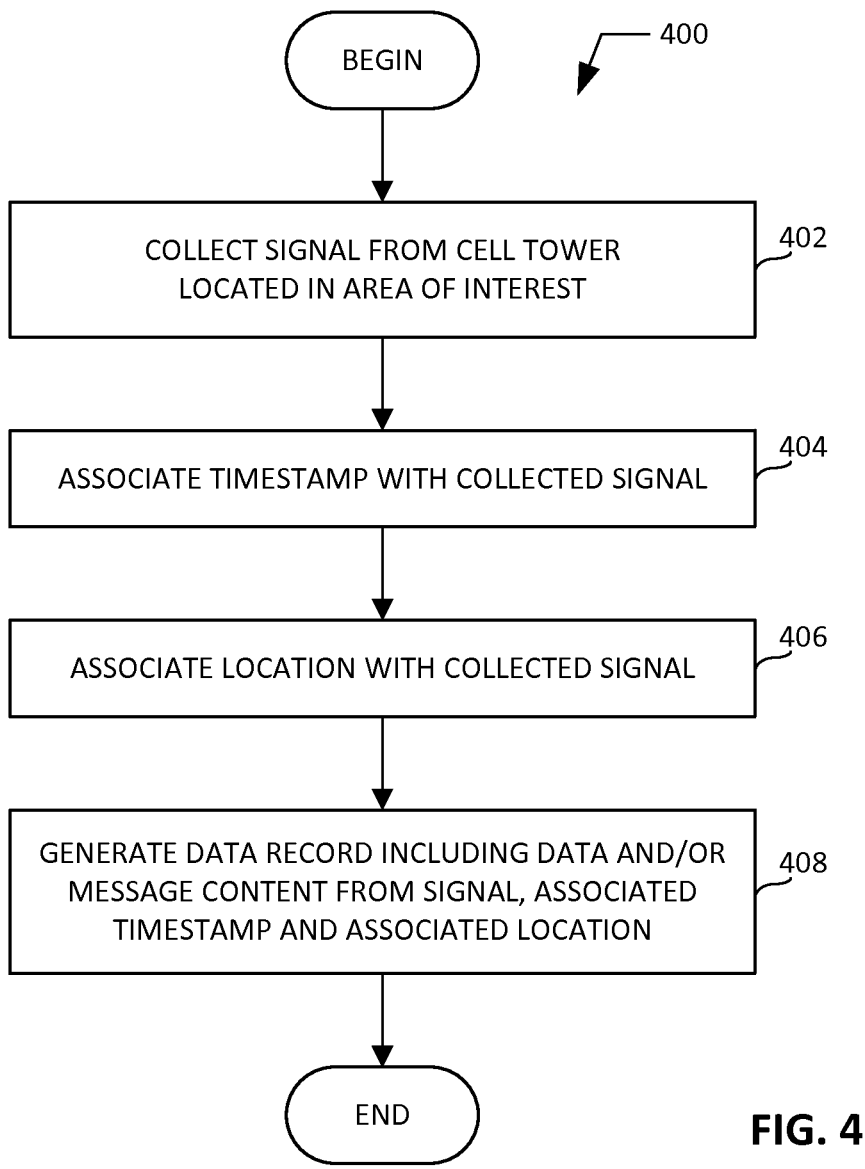
FIG. 4 is a flowchart representative of example machine-readable instructions that may be executed to implement the example data collector of FIGS. 1 and/or 3.
Figure 6:
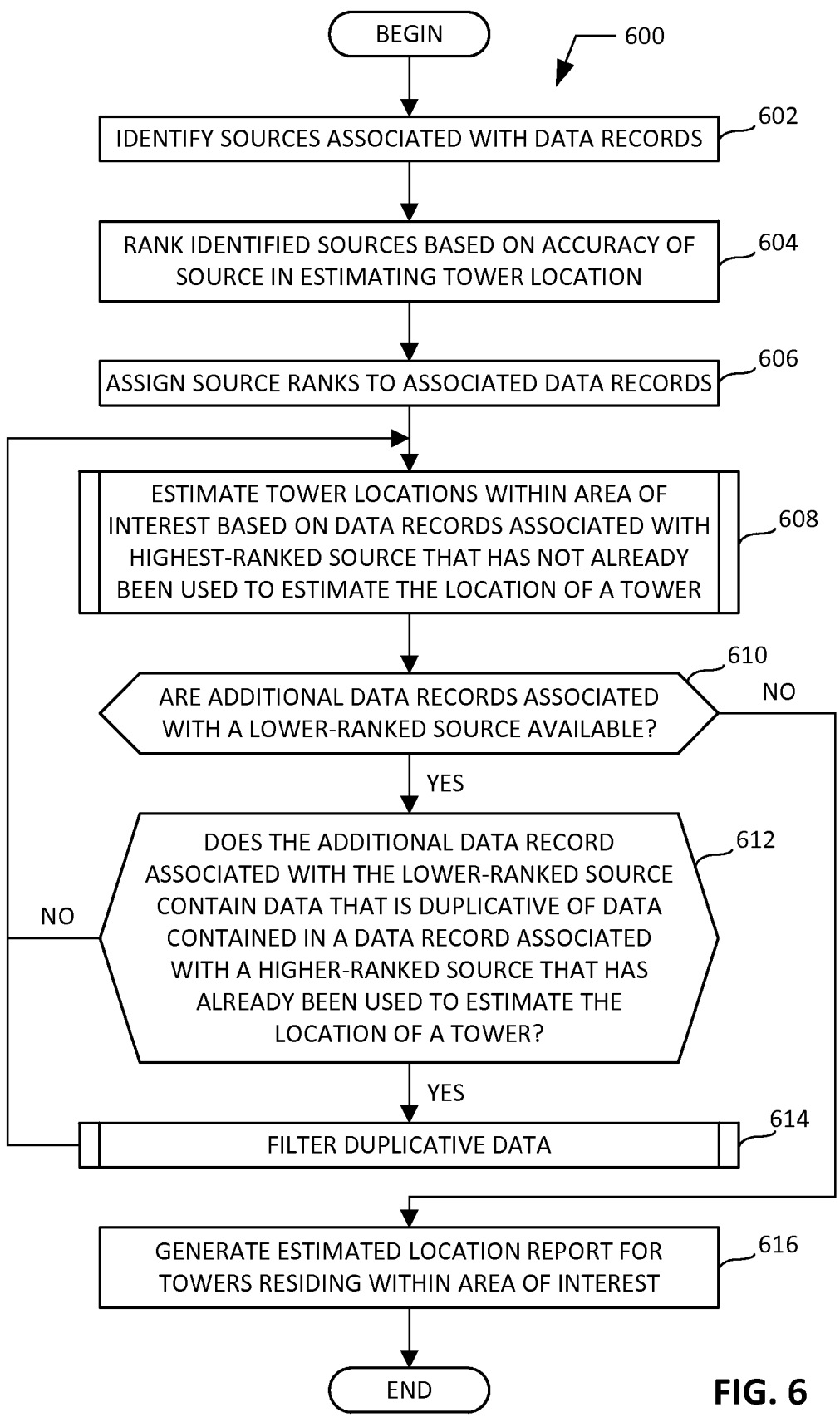
FIG. 6 is a flowchart representative of example machine-readable instructions that may be executed to implement the example data classifier and the example location estimator of FIGS. 1 and/or 3.
Figure 12:
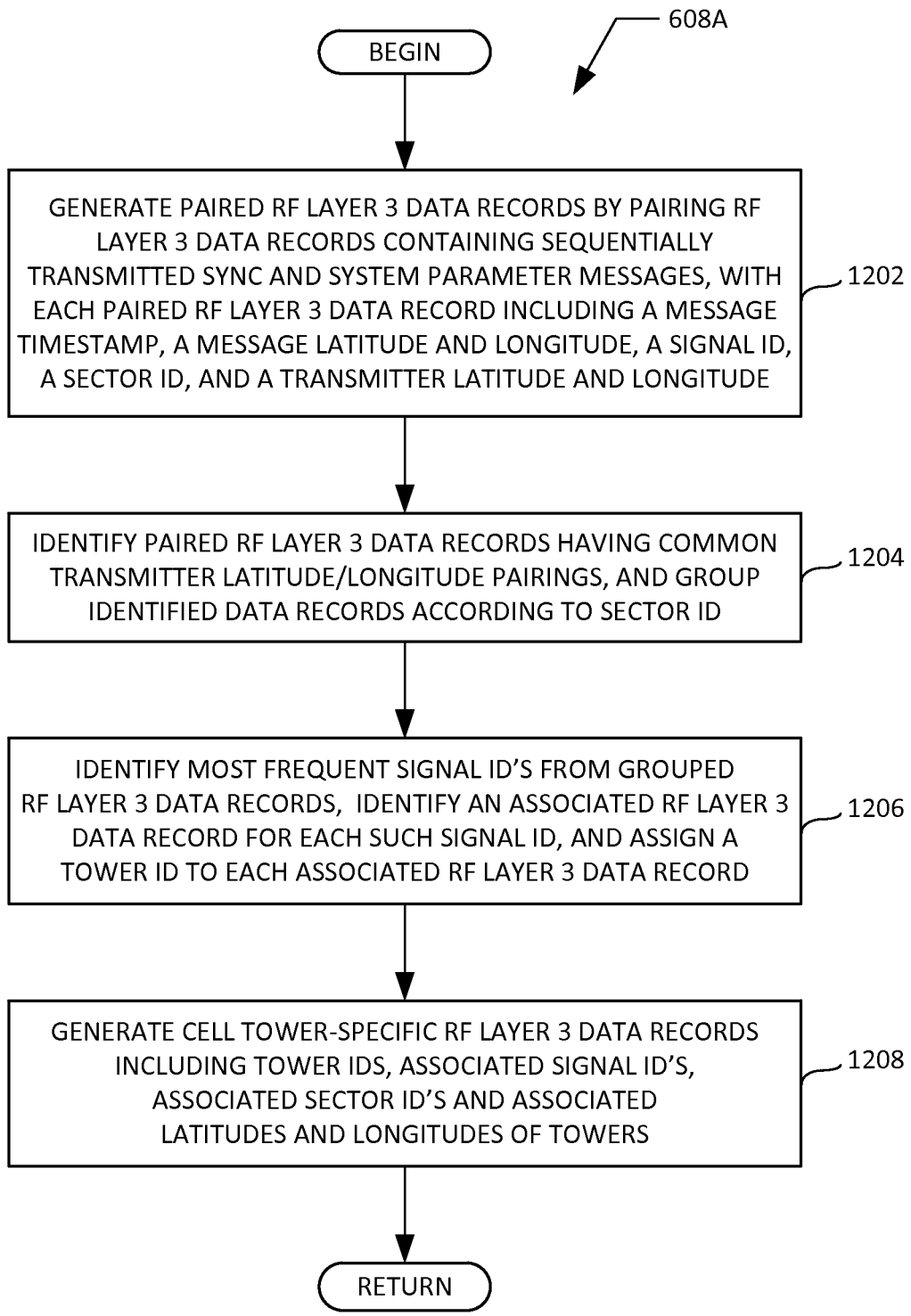
FIG. 12 is a flowchart representative of example machine-readable instructions that may be executed to implement the example data analyzer of FIG. 3 for RF Layer 3 data.
Figure 19:
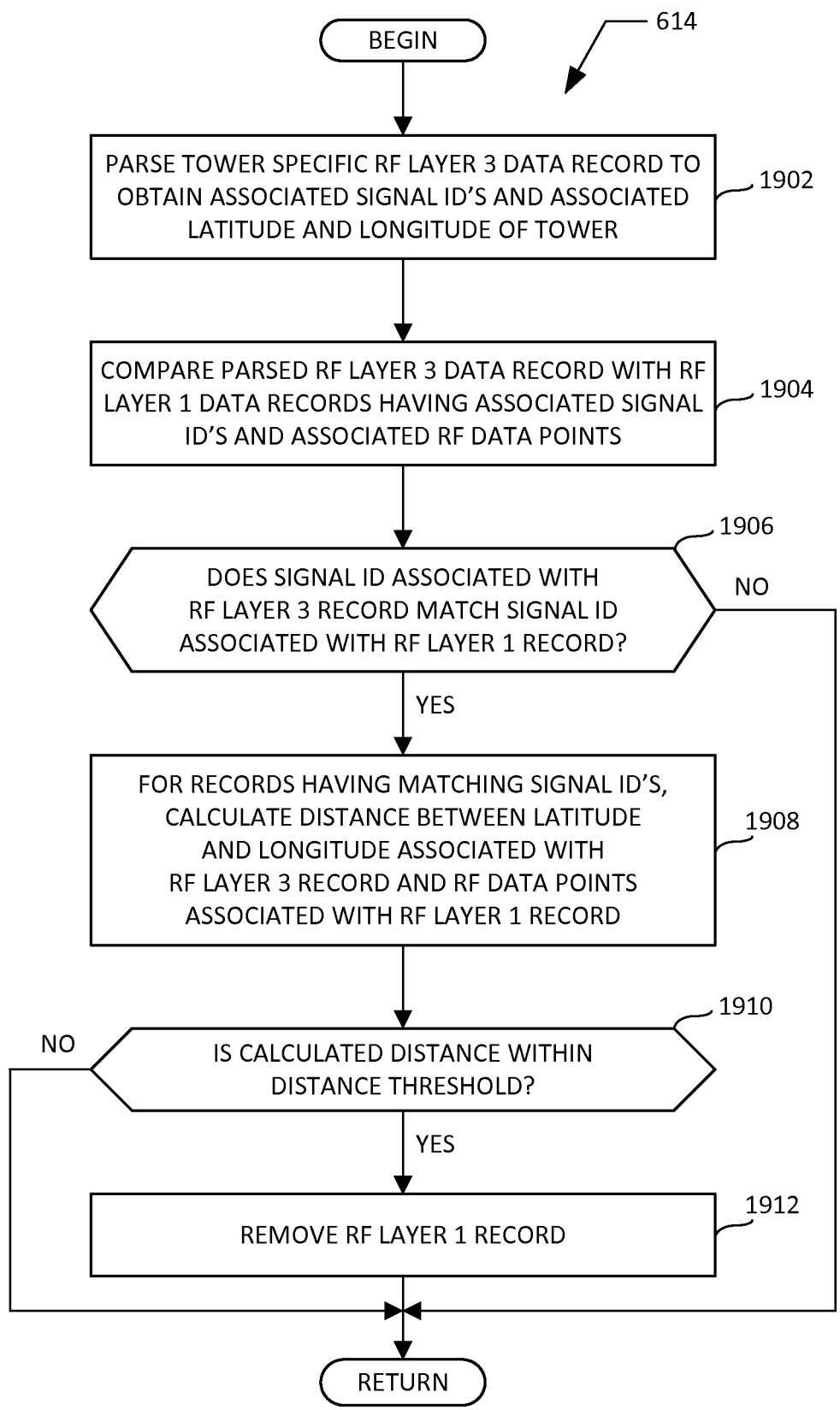
FIG. 19 is a flowchart representative of example machine-readable instructions that may be executed to implement the example data filter of FIG. 3 for removing RF Layer 1 data that is duplicative of RF Layer 3 data.

A flowchart representative of example machine readable instructions for implementing the example data collector 104 of FIGS. 1 and/or 3 is shown in FIG. 4. Flowcharts representative of example machine readable instructions for implementing the example data classifier 122 and the example location estimator 124 of FIGS. 1 and/or 3 are shown in FIGS. 6, 12, 19 and/or 20. In these examples, the machine readable instructions comprise one or more programs for execution by a processor such as the processor 2712 shown in the example processor platform 2700 discussed below in connection with FIG. 27, and/or the example processor 2812 shown in the example processor platform 2800 described below in connection with FIG. 28. The program(s) may be embodied in software stored on a tangible computer readable storage medium such as a CD-ROM, a floppy disk, a hard drive, a digital versatile disk (DVD), a Blu-ray disk, or a memory associated with the processor 2712 and/or 2812, but the entire program(s) and/or parts thereof could alternatively be executed by a device other than the processor 2712 and/or 2812, and/or embodied in firmware or dedicated hardware. Further, although the example program(s) is/are described with reference to the flowcharts illustrated in FIGS. 4, 6, 12, 19 and 20, many other methods of implementing the example data collector 104, the example data classifier 122 and/or the example location estimator 124 may alternatively be used. For example, the order of execution of the blocks may be changed, and/or some of the blocks described may be changed, eliminated, or combined.

As mentioned above, the example processes of FIGS. 4, 6, 12, 19 and 20 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 6, 12, 19 and 20 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of example machine-readable instructions 400 that may be executed to implement the example data collector 104 of FIGS. 1 and/or 3. The example program 400 of FIG. 4 begins when the example data receiver 302 of the example data collector 104 of FIG. 3 collects a signal from a cell tower (e.g., the example cell tower 110 of FIG. 1) located in an area of interest (e.g., the example area of interest 106 of FIG. 1) (block 402). The example data receiver 302 of FIG. 3 associates a timestamp with the collected signal (block 404), and the example location detector 304 of FIG. 3 associates a location with the collected signal (block 406).

The example record generator 306 of FIG. 6 generates a data record associated with the collected signal that includes data and/or message content from the collected signal, the associated timestamp, and the associated location (block 408). For example, an example data record generated by the example record generator 306 of FIG. 3 at block 408 of the example program 400 of FIG. 4 may include a signal and/or message timestamp, a signal and/or message latitude (e.g., the latitude of the location at which the signal and/or message was received by the example data collector 104 as determined by the example location detector 304), a signal and/or message longitude (e.g., the longitude of the location at which the signal and/or message was received by the example data collector 104 as determined by the example location detector 304), and the content of, and/or data associated with the content of, the received signal and/or message.

FIG. 5 is an illustration of an example data structure 500 containing example data records 502-520 generated by the example record generator 306 of the example data collector 104 of FIG. 3. The example data records 502, 504, 506, 508, 510, 512, 514, 516, 518 and 520 of FIG. 5 correspond to the respective example signals "S1," "S2," "S3," "S4," "S5," "S6," "S7," "S8," "S9" and "S10" described above in connection with FIG. 1. In the illustrated example of FIG. 5, each data record (shown in FIG. 5 as a row in the example data structure 500) generated by the example record generator 306 includes a signal and/or message timestamp, a signal and/or message latitude, a signal and/or message longitude, and the content of, and/or data associated with the content of, the received signal and/or message. For example, a first data record 502 generated by the example record generator 306 includes a message timestamp of "T0", a message latitude of "MSG_LAT1", a message longitude of "MSG_LONG1", and the content of, and/or data associated with the content of, an RF Layer 3 "SYNC" message that has been received and/or otherwise retrieved by the example data receiver 302. A second data record 504 generated by the example record generator 306 includes a message timestamp of "T1", a message latitude of "MSG_LAT2", a message longitude of "MSG_LONG2", and the content of, and/or data associated with the content of, an RF Layer 3 "SYSTEM PARAMETERS" message that has been received and/or otherwise retrieved by the example data receiver 302. A third data record 506 generated by the example record generator 306 includes a message timestamp of "T2", a message latitude of "MSG_LAT3", a message longitude of "MSG_LONG3", and the content of, and/or data associated with the content of, an RF Layer 1 "Signal Power" message that has been received and/or otherwise retrieved by the example data receiver 302.

While the example data records 502-520 illustrated in FIG. 5 include a specific number of data fields, the data records generated by the example record generator 306 may include any number of fields containing any amount of information associated with the received signal, including without limitation information that is more detailed than what is described above and shown in FIG. 5 in connection with example data records 502-520. As one example, a data record generated by the example record generator 306 may include a single field having a data string that includes all of the message timestamp, message latitude, message longitude, and/or message content information that is described above and shown in FIG. 5 in connection with example data record 502. Furthermore, while each of the example data records 502-520 illustrated in FIG. 5 includes an equal number of data fields, a data record generated by the example record generator 306 may include any number of data fields, and the number of data fields from one data record to the next, and/or the type of information within those data fields, may differ.

FIG. 6 is a flowchart representative of example machine-readable instructions 600 that may be executed to implement the example data classifier 122 and the example location estimator 124 of FIGS. 1 and/or 3. The example program 600 of FIG. 6 begins when the example source identifier 312 of FIG. 3 identifies the sources and/or source types from which the data contained in respective ones of the data records generated by the example record generator 306 was collected by the example data collector 104 of FIG. 3 (block 602).

FIG. 7 is an illustration of an example data structure 700 containing example data records 702-720 (shown in FIG. 7 as rows in the example data structure 700) generated and/or organized by the example source identifier 312 of FIG. 3. In the illustrated example of FIG. 7, respective ones of the example data records 702-720 have been derived from corresponding ones of the example data records 502-520 shown in FIG. 5 that were generated by the example record generator 306 of FIG. 3. The example source identifier 312 has modified the example data records 502-520 by identifying, assigning and/or otherwise associating a source type with each such record, thereby resulting in the generation of corresponding example data records 702-720 as shown in the example data structure 700 of FIG. 7. In the illustrated example, the identification, assignment and/or association of a source type in relation to a particular data record is based on information contained within the example "Message Content" field of each data record that the example source identifier 312 recognizes as being indicative of a particular source type.

FIG. 8 is an illustration of alternate example data structures 800, 850 containing example data records 502-520 (shown in FIG. 8 as rows in the example data structures 800, 850) for which the example source identifier 312 of FIG. 3 has identified, assigned and/or otherwise associated a source type. In the illustrated example of FIG. 8, respective ones of the example data records 502-520 correspond to the example data records 502-520 shown in FIG. 5 that were generated by the example record generator 306 of FIG. 3. The example source identifier 312 has classified, associated and/or organized the example data records 502-520 such that each data record has been placed in a respective example data structure 800, 850 containing data records associated solely with that particular source type. For example, the example data structure 800 contains example data records 502, 504, 510, 512, 518 and 520, each of which has been associated with an "RF Layer 3" source type, while the example data structure 850 contains example data records 506, 508, 514 and 516, each of which has been associated with an "RF Layer 1" source type. In the illustrated example of FIG. 8, the identification, classification, association and/or organization of a particular data record with and/or in relation to a particular source type is based on information contained within the example "Message Content" field of each data record that the example source identifier 312 recognizes as being indicative of a particular source type.

Returning to the flowchart of FIG. 6, once the example source identifier 312 has identified the source types from which the data contained in respective ones of the data records was collected, the example source ranker 314 of FIG. 3 ranks the identified source types based on a relative degree of accuracy associated with each source type in estimating the location of a cell tower (block 604).

FIG. 9 is an illustration of an example data ranking structure 900 utilized, provided and/or generated by the example source ranker 314 of FIG. 3 to define, assign and/or otherwise associate a source rank with a source type having an associated accuracy with respect to the source type's effectiveness in estimating the location of a cell tower. For example, the source ranker 314, as illustrated with reference to the example data structure 900 shown in FIG. 9, has ranked an example RF Layer 3 source type 902 and an example RF Layer 1 source type 904. An associated accuracy of each example source type is predetermined, known by and/or otherwise provided to the example source ranker 314.

In the illustrated example of FIG. 9, the example RF Layer 3 source type 902 is associated with a high degree of accuracy, because signals received and/or otherwise retrieved from the RF Layer 3 source contain information from which the actual latitude and longitude of a cell tower and/or its transmitters can be identified. In contrast, the example RF Layer 1 source type 904 is associated with a relatively lower degree of accuracy, because signals received and/or otherwise retrieved from the RF Layer 1 source do not contain information from which the actual latitude and longitude of a cell tower and/or its transmitters can be identified. In the illustrated example of FIG. 9, the example data structure 900 reflects that the source ranker 314 has assigned a rank of "1" to the example RF Layer 3 source type 902 and a rank of "2" to the example RF Layer 1 source type 904, as the RF Layer 3 source type 902 has an associated accuracy that is more effective, relative to the associated accuracy of the RF Layer 1 source type 904, with respect to estimating the location of a cell tower. As such, the example source ranker 312 has identified and/or ranked the example RF Layer 3 source type 902 as a higher-ranking source (rank 1), and the example RF Layer 1 source type 904 as a lower-ranking source (rank 2).

Returning to the example flowchart of FIG. 6, the example source ranker 314 also assigns and/or otherwise associates respective ones of the source ranks determined by the example source ranker 314 with respective ones of the data records based on the source type identifications provided by the example source identifier 312 (block 606).

FIG. 10 is an illustration of an example data structure 1000 containing example data records 1002-1020 (shown in FIG. 10 as rows in the example data structure 1000) that have been generated and/or organized by the example source ranker 314 of FIG. 3. In the illustrated example of FIG. 10, the example data records 1002-1020 have been derived from corresponding ones of the example data records 702-720 shown in FIG. 7 based on the example data ranking structure 900 shown in FIG. 9. The example source ranker 312 has modified the example data records 702-720 by identifying, assigning and/or otherwise associating a source type with each such record, thereby resulting in the generation of corresponding example data records 1002-1020 as shown in the example data structure 1000 of FIG. 10. In the illustrated example, the identification, assignment and/or association of a source rank in relation to a particular data record is based on information contained within the example "Source Type" field of each data record, along with the relationship that the example data ranking structure 900 provides between sources types and associated source ranks. For example, the example source ranker 314 recognizes that the example record 702 is associated with an RF Layer 3 source type. The example source ranker 314 modifies the example data record 702 based on the relationship defined in the example data ranking structure 900, whereby an RF Layer 3 source type is assigned a source rank of "1". Accordingly, the example source ranker 314 identifies, assigns and/or otherwise associates a source rank of "1" with the example record 702, thereby resulting in the generation of corresponding example data record 1002 as shown in the example data structure 1000 of FIG. 10.

FIG. 11 is an illustration of alternate example data structures 1100, 1150 containing example data records 502-520 (shown in FIG. 11 as rows in the example data structures 1100, 1150) for which the example source ranker 314 of FIG. 3 has identified, assigned and/or otherwise associated a source rank. In the illustrated example of FIG. 11, the example data records 502-520 correspond to the example data records 502-520 shown in FIG. 8 based on the example data ranking structure 900 shown in FIG. 9. The example source ranker 314 has classified, associated and/or organized the example data records 502-520 such that each data record has been placed in a respective example data structure 1100, 1150 containing data records associated solely with that particular source type and associated source rank. For example, the example data structure 1100 contains example data records 502, 504, 510, 512, 518 and 520, each of which has been associated with an "RF Layer 3" source type and an associated source rank of "1", while the example data structure 1150 contains example data records 506, 508, 514 and 516, each of which has been associated with an "RF Layer 1" source type and an associated source rank of "2". In the illustrated example of FIG. 11, the identification, classification, association and/or organization of a particular data record with and/or in relation to a particular source rank is based on the prior identification, classification, and or association performed by the example source identifier 312 as described above in connection with FIG. 8, along with the relationship that the example data ranking structure 900 provides between source types and associated source ranks. For example, the example source ranker 314 recognizes that each of the example data records contained in the example data structure 800 is associated with an RF Layer 3 source type. The example source ranker 314 modifies the example data structure 800 based on the relationship defined in the example data ranking structure 900, whereby an RF Layer 3 source type is assigned a source rank of "1". Accordingly, the example source ranker 314 identifies, assigns and/or otherwise associates a source rank of "1" with the example data structure 800, thereby resulting in the generation of corresponding example data structure 1100 as shown in FIG. 11.

Returning to the example flowchart of FIG. 6, the example location estimator 124 of FIG. 3, via the example data analyzer 322 of FIG. 3, determines an estimated location for respective ones of the cell towers (e.g., the example cell towers 110, 112, 114, 116, 118 of FIG. 1) residing in the area of interest (e.g., the example area of interest 106) by first processing the data records associated with the highest-ranked source that has not already been used to estimate the location of a cell tower residing within the area of interest (block 608).

When the data records associated with the highest-ranked source that has not already been used to estimate the location of a cell tower residing within the area of interest constitute RF Layer 3 data records, the example program 600 executes a sub-process at block 608 with respect to the RF Layer 3 data records. FIG. 12 is a flowchart representative of example machine-readable instructions 608A that may be executed to implement the example data analyzer 322 of FIG. 3 for RF Layer 3 data records in connection with the sub-process 608A associated with block 608 of FIG. 6. The example program 608A of FIG. 12 begins when the example data analyzer 322 of FIG. 3 generates paired RF Layer 3 data records based on the RF Layer 3 data records generated by the example record generator 306 of FIG. 3 (block 1202). In some examples, a paired RF Layer 3 data record is generated by combining an RF Layer 3 data record including a "SYNC" message with a sequentially transmitted RF Layer 3 data record including a "SYSTEM PARAMETERS" message. The paired RF Layer 3 data record contains a message timestamp, a message latitude and longitude, a Signal ID, a Sector ID, and a transmitter latitude and longitude (block 1202). The pairing process is described in greater detail below in connection with FIGS. 13 and 14.

Figure 13:
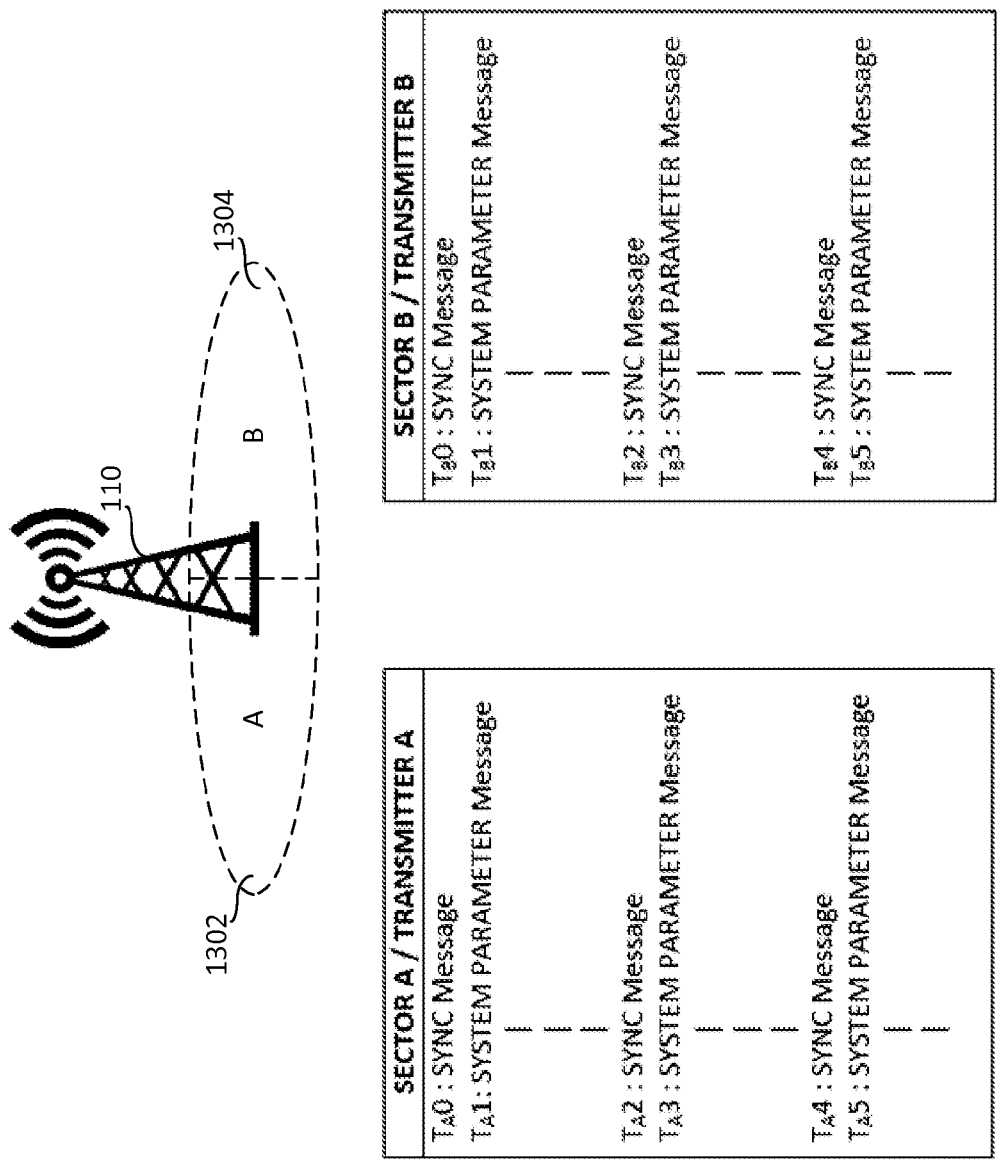
FIG. 13 is an illustration of an example cell tower transmitting signals that include RF Layer 3 data and/or messages.

FIG. 13 is an illustration of a cell tower (e.g., the example cell tower 110 of FIG. 1) having two transmitters that respectively transmit RF Layer 3 signals including RF Layer 3 data and/or messages into two example coverage sectors 1302, 1304. As illustrated in FIG. 13, the RF Layer 3 signals transmitted into coverage sector "A" 1302 may include a series of "SYNC" messages transmitted at times "$T_A0$," "$T_A2$" and "$T_A4$" that sequentially alternate with a series of corresponding "SYSTEM PARAMETERS" messages included in RF Layer 3 signals transmitted at times "$T_A1$," "$T_A3$" and "$T_A5$." Similarly, the RF Layer 3 signals transmitted into coverage sector "B" 1304 may include a series of "SYNC" messages transmitted at times "$T_B0$," "$T_B2$" and "$T_B4$" that sequentially alternate with a series of corresponding "SYSTEM PARAMETERS" messages included in RF Layer 3 signals transmitted at times "$T_B1$," "$T_B3$" and "$T_B5$." It may be advantageous for the example data analyzer 322 of FIG. 3 to pair, associate and/or otherwise combine information from the sequentially transmitted "SYNC" and "SYSTEM PARAMETERS" messages. For example, the data analyzer 322 may generate a single paired RF Layer 3 data record containing information from both the "SYNC" message included in the RF Layer 3 signal transmitted into coverage sector "A" 1302 at time "T0" and the "SYSTEM PARAMETERS" message included in the RF Layer 3 signal transmitted into coverage sector "A" 1302 at time "T1."

The generation of such paired, associated and/or otherwise combined RF Layer 3 data records is particularly advantageous with respect to combining the information contained in sequentially transmitted "SYNC" and "SYSTEM PARAMETERS" messages. Such messages separately contain information that, for purposes of estimating the location of a cell tower (e.g., the example cell tower 110 of FIG. 1) according to the example location estimation system 300 of FIG. 3, is more useful when is paired, associated and/or otherwise combined into a single data record. For example, an RF Layer 3 "SYNC" message may contain a Signal ID associated with the transmitter of the cell tower from which a signal including data and/or a message containing the Signal ID was transmitted. In some examples, the Signal ID contained in the RF Layer 3 "SYNC" message is associated with a transmitted signal that is received and/or otherwise retrieved at a first time by the example data collector 104 of FIGS. 1 and/or 3, while a sequentially transmitted RF Layer 3 "SYSTEM PARAMETERS" message that is received and/or otherwise retrieved at a second time by the example data collector 104 may contain a "Sector ID" parameter as well as the transmitter's latitude and longitude parameters. The example data analyzer 322 of FIG. 3 pairs and/or otherwise associates the Signal ID of a "SYNC" message that has been received and/or otherwise retrieved by the example data collector 104 with the Sector ID, latitude and longitude information of a "SYSTEM PARAMETERS" message that has sequentially been received and/or otherwise retrieved by the example data collector 104. A single paired RF Layer 3 data record of the paired and/or otherwise associated "SYNC" and "SYSTEM PARAMETERS" messages is then generated by the example data analyzer 322 that includes the Signal ID, the Sector ID, and the latitude and longitude information.

FIG. 14 illustrates an example data structure 1400 containing example paired RF Layer 3 data records 1402-1426 (shown in FIG. 14 as respective rows in the example data structure 1400) that were generated by the example data analyzer 322 of FIG. 3 by pairing, associating and/or otherwise combining "SYNC" messages received and/or otherwise retrieved by the example data collector 104 with "SYSTEM PARAMETERS" messages sequentially received and/or otherwise retrieved by the example data collector 104 from one or more RF Layer 3 data sources. In the illustrated example of FIG. 14, the example paired RF Layer 3 data record 1402 includes a message timestamp of "$T_f 0$," a message latitude of "MSG_LAT1," a message longitude of "MSG_LONG1," a Signal ID of "1," a Sector ID of "1001," a transmitter latitude of "X1," and a transmitter longitude of "Y1." While the example paired RF Layer 3 data records 1402-1426 illustrated in FIG. 14 include a specific number of data fields, the paired RF Layer 3 data records generated by the example data analyzer 322 may include any number of fields containing any amount of information associated with the signals and/or the messages and/or data received by the example data collector 104, including without limitation information that is more detailed than what is described above and shown in FIG. 14 in connection with the example paired RF Layer 3 data records 1402-1426.

In some examples, the RF Layer 3 data records, prior to being paired by the example data analyzer 322 of FIG. 3, may first be processed by the example source identifier 312 and/or the example source ranker 314 of FIG. 3. For example, FIG. 15 is an illustration of an example data structure 1500 containing paired RF Layer 3 data records 1402-1426 (shown in FIG. 15 as respective rows in the example data structure 1500) generated by the example data analyzer 322 in a similar manner to that described above with respect to the example paired RF Layer 3 data records 1402-1426 of FIG. 14. However, in the example of FIG. 15, the example data analyzer 322 has generated the example paired RF Layer 3 data records 1402-1426 after the example data identifier 312 and the example data ranker 314 have first processed the RF Layer 3 data records used by the example data analyzer 322 to generate the example paired RF Layer 3 data records 1402-1426. In the illustrated example of FIG. 15, the example data structure 1500 has been assigned and/or associated with a source rank of "1" by the example source ranker 314 of FIG. 3. In other examples, the pairing of the RF Layer 3 data records may alternatively be performed by the example record generator 306 of FIG. 3, and the resultant paired RF Layer 3 data records may then be further processed by the example source identifier 312, the example source ranker 314 and/or the example data analyzer 322 of FIG. 3.

Returning to the flowchart of FIG. 12, the example data analyzer 322 of FIG. 3 identifies, from among the paired RF Layer 3 data records, those data records having common transmitter latitude/longitude pairings (block 1204). The example data analyzer 322 then groups the identified data records according to Sector ID (block 2506). For example, to build a relationship between the Signal ID parameters and Sector ID parameters associated with the example paired RF Layer 3 data records 1402-1426 of FIG. 14, the example data analyzer 322 of FIG. 3 groups, categorizes and/or otherwise organizes respective ones of the example paired RF Layer 3 data records 1402-1426 having the same Sector ID and identical, or nearly identical (e.g., within a threshold distance) transmitter latitudes and longitudes.

FIG. 16 is an illustration of an example data structure 1600 containing example paired RF Layer 3 data records from among the example paired RF Layer 3 data records 1402-1426 of FIG. 14 that the example data analyzer 322 has grouped together. In the illustrated example of FIG. 16, the example data analyzer 322 has grouped together example paired RF Layer 3 data records 1402, 1406, 1408 and 1420, as each such data record contains a Sector ID of "1001", a transmitter latitude of "X1", and a transmitter longitude of "Y1". Similarly, the example data analyzer 322 has grouped together example paired RF Layer 3 data records 1404, 1414 and 1426, as each such data record contains a Sector ID of "1002", a transmitter latitude of "X1", and a transmitted longitude of "Y1". The example data analyzer 322 has also grouped together example paired RF Layer 3 data records 1418 and 1422, as each such data record contains a Sector ID of "1003", a transmitter latitude of "X1", and a transmitted longitude of "Y1". The example data structure 1600 of FIG. 16 does not include any of example paired RF Layer 3 data records 1410, 1412, 1416 or 1424 shown in FIG. 14, as each such data record contained a Sector ID that did not match the Sector ID of any other example paired RF Layer 3 data record shown in FIG. 14. Thus, the example data analyzer 322 treats the data records containing such non-matching Sector IDs as noise and/or otherwise irrelevant information.

Returning to the flowchart of FIG. 12, the example data analyzer 322 identifies, from among the grouped paired RF Layer 3 data records, those data records having the most frequent Signal IDs (block 1206). The example data analyzer 322 then identifies an associated paired RF Layer 3 data record for each such Signal ID, and assigns a Tower ID to each associated paired RF Layer 3 data record (block 1206). For example, the example data analyzer 322 of FIG. 3 identifies and/or selects a paired RF Layer 3 data record from each grouping of paired RF Layer 3 data records based on the frequency (e.g., satisfying a threshold number of occurrences) of the Signal IDs contained by the example data records within the grouping. The example data analyzer 322 then tags, assigns and/or otherwise associates each selected paired RF Layer 3 data record with a Tower ID. In some examples, each Tower ID assigned by the data analyzer 322 is unique to a particular cell tower for which the example data analyzer 322 and/or the example location estimator 124 of FIG. 3 will estimate a location.

FIG. 17 is an illustration of an example data structure 1700 containing example paired RF Layer 3 data records 1702, 1704 and 1706 that have been generated by the example data analyzer 322 of FIG. 3 based on the example grouped paired RF Layer 3 data records 1402, 1404 and 1418 shown in FIG. 16. For example, with reference to FIG. 16, three of the four example RF Layer 3 data records within the example grouped RF Layer 3 data records 1402, 1406, 1408 and 1420 contain a Signal ID of "1". Based on the satisfaction of a frequency threshold, the example data analyzer 322 has selected example paired RF Layer 3 data record 1402 having a Signal ID of "1" for inclusion in the example data structure 1700 of FIG. 17. The example data analyzer 322 has assigned a Tower ID of "001" to that data record, thereby resulting in the generation of corresponding example data record 1702 as shown in the example data structure 1700 of FIG. 17. Similarly, again with reference to FIG. 16, two of the three example RF Layer 3 data records within the example grouped RF Layer 3 data records 1404, 1414 and 1426 contain a Signal ID of "2". Based on the satisfaction of a frequency threshold, the example data analyzer 322 has selected example paired RF Layer 3 data record 1404 having a Signal ID of "2" for inclusion in the example data structure 1700 of FIG. 17, and has assigned the same Tower ID of "001" to that data record, thereby resulting in the generation of corresponding example data record 1704 as shown in the example data structure 1700 of FIG. 17. Once again with reference to FIG. 16, both of the example RF Layer 3 data records within the example grouped RF Layer 3 data records 1418 and 1422 contain a Signal ID of "3". Based on the satisfaction of a frequency threshold, the example data analyzer 322 has selected example paired RF Layer 3 data record 1418 having a Signal ID of "3" for inclusion in the example data structure 1700 of FIG. 17, and has assigned the same Tower ID of "001" to that data record, thereby resulting in the generation of corresponding example data record 1718 as shown in the data structure 1700 of FIG. 17.

Returning to the flowchart of FIG. 12, the example data analyzer 322 generates cell tower-specific RF Layer 3 data records, with each such data record including a Tower ID, associated Signal IDs, associated Sector IDs, and associated transmitter latitudes and longitudes (block 1208). The information contained in such cell tower-specific RF Layer 3 data records provides an estimated location (e.g., based on the transmitter latitude and longitude) of an identified cell tower (e.g., the Tower ID) and its associated transmitters (e.g., the Signal IDs) and associated sectors (e.g., the Sector IDs). For example, the example data structure 1700 shown in FIG. 17 contains three example RF Layer 3 data records 1702, 1704 and 1718, each of which contains a Signal ID, a Sector ID, a Tower ID, a transmitter latitude, and a transmitter longitude. Once the example RF Layer 3 data records 1702, 1704 and 1718 have been organized in this manner, the example data analyzer 322 further groups, categorizes and/or otherwise organizes any data records contained in the example data structure 1700 having the same latitude and longitude such that a number of distinct transmitters and/or coverage sectors associated with a particular cell tower, as identified by a particular Tower ID, can be identified.

FIG. 18 is an illustration of an example data structure 1800 containing an example cell tower-specific RF Layer 3 data record 1802 generated by the example data analyzer 322 of FIG. 3 based on the example RF Layer 3 data records 1702, 1704 and 1718 shown in FIG. 17. For example, with reference to FIG. 17, each of the example RF Layer 3 data records 1702, 1704 and 1718 contains a transmitter latitude of "X1" and a transmitter longitude of "Y1". Based on this commonality, the example data analyzer 322 has consolidated example RF Layer 3 data records 1702, 1704 and 1718, thereby resulting in the generation of the example RF Layer 3 cell tower-specific data record 1802 as shown in the example data structure 1800 of FIG. 18. The example cell tower-specific RF Layer 3 data record 1802 contains a list of Signal IDs, a list of Sector IDs, a transmitter latitude, and a transmitter longitude, all of which are associated with the Tower ID that is likewise contained in the example cell tower-specific RF Layer 3 data record 1802.

As described above, cell towers typically include of one or more transmitters installed at a common location (e.g., attached to the cell tower). The number of distinct Signal IDs included in the example cell tower-specific RF Layer 3 data record 1802 indicates the number of transmitters and/or coverage sectors that are located on and/or at a particular cell tower having a Tower ID of "001", a latitude of "X1", and a longitude of "Y1". Based on the location information (e.g., the actual latitude and actual longitude at which the cell tower transmitter is located) contained in any of the example cell tower-specific RF Layer 3 data record 1802, and/or the example RF Layer 3 data structure 1800, the example data analyzer 322 and/or the example location estimator 124 of FIG. 3 determines an estimated location of the example cell tower having a Tower ID of "001". By virtue of using RF Layer 3 data records processed in the manner describe above, because the estimated location is based on the actual latitude and actual longitude of the transmitters associated with the Tower ID "001" cell tower, the estimated location will demonstrate little, if any, location error relative to the actual physical location of the Tower ID "001" cell tower.

While the example paired, grouped, selected and/or cell tower-specific RF Layer 3 data records 1402-1426, 1702, 1704, 1718 and 1802, and/or data structures 1400, 1500, 1600, 1700 and 1800 illustrated in FIGS. 14, 15, 16, 17 and 18 include a specific number of data fields and/or a specific structure, the RF Layer 3 data records and/or data structures generated and/or analyzed by the example data analyzer 322 in connection with the sub-process 608A of FIG. 12 may include any number of fields containing any amount of information, and/or any form or structure, including without limitation information that is more detailed than what is described above and shown in FIGS. 14, 15, 16, 17 and 18 in relation to example data records 1402-1426, 1702, 1704, 1718 and 1802, and example data structures 1400, 1500, 1600, 1700 and 1800.

Following the execution of blocks 1202-1208 of the sub-process 608A described above in connection with the processing of RF Layer 3 data records as described in connection with the flowchart of FIG. 12, the sub-process 608A returns to block 608 of the example program 600 of FIG. 6, and the example program 600 then proceeds to block 610.

Returning to the flowchart of FIG. 6, once the example location estimator 124 has processed the data records associated with the highest-ranked source that has not already been used to estimate the location of a cell tower residing within the area of interest, the example location estimator 124, via the example data analyzer 322, then determines whether additional data records associated with a lower-ranked source are available for processing (block 610).

If such additional data records associated with a lower-ranked source are available, the example location estimator 124, via the example data filter 324 of FIG. 3, determines whether the additional data records associated with the lower-ranked source contain data that is duplicative of data contained in the data records associated with a higher-ranked source that has already been used to estimate the location of a cell tower residing within the area of interest (block 612). If the example data filter 324, at block 612, does not identify duplicative data, the program 600 returns to block 608. If the example data filter 324, at block 612, instead identifies duplicative data, the example data filter 324 filters out any data records associated with the lower-ranking source containing the duplicative data (block 614), and the example program 600 then returns to block 608 as described above.

FIG. 19 is a flowchart representative of example machine-readable instructions 614 that may be executed as a sub-process to block 614 of the example machine-readable instructions 600 of FIG. 6 to implement the example data filter 324 of FIG. 3 in a scenario involving higher-ranking data records (e.g., RF Layer 3) and lower-ranking data records (e.g., RF Layer 1). The example program 614 of FIG. 19 begins when the example data filter 324 parses a cell tower-specific RF Layer 3 data record (e.g., the example cell tower-specific RF Layer 3 data record 1802 of FIG. 18) to obtain the associated Signal IDs and associated transmitter latitude and longitude (block 1902). For example, with reference to FIG. 18, the example data filter 324 parses the example cell tower-specific RF Layer 3 data record 1802 and identifies, from the parsed RF Layer 3 data record, a Tower ID "001", Signal IDs "1", "2" and "3", and a location including a latitude "X1" and a longitude "Y1."

The example data filter 324 compares the parsed RF Layer 3 data record with available RF Layer 1 data records having associated Signal IDs and associated RF data points (e.g., message latitudes and longitudes) (block 1904). The example data filter 324 then determines whether the parsed RF Layer 3 data record contains a Signal ID that matches a Signal ID contained in any RF Layer 1 data record (block 1906). If there are no matching Signal IDs among the compared RF Layer 3 and RF Layer 1 data records, the example sub-process 614 of FIG. 19 terminates. If, however, a matching Signal ID is found, the example data filter 324 calculates the distance between the latitude and longitude associated with the RF Layer 3 data record on the one hand, and the RF Layer 1 data points (e.g., message latitude and longitude) contained in the matching RF Layer 1 data record on the other hand (block 1908).

The example data filter 324 determines whether the calculated distance is within a distance threshold (block 1910). If the calculated distance is not within the distance threshold, the example sub-process terminates. If, however, the calculated distance is within the distance threshold, the example data filter 324 removes the corresponding RF Layer 1 data record, such that the removed RF Layer 1 data record will not be considered by the example data analyzer 322 when the example data analyzer 322 processes the lower-ranking RF Layer 1 data records (block 1912).

For example, with reference to the example cell tower-specific RF Layer 3 data record 1802 of FIG. 18 after the data record has been parsed by the example data filter 324 as described above, the example data filter 324 identifies any RF Layer 1 data record having a Signal ID of "1", "2" or "3." The example data filter 324 then identifies the message latitude and message longitude of any RF Layer 1 data record having such a matching Signal ID, and determines whether the identified message latitude and message longitude of the RF Layer 1 data record corresponds to a location that is within a threshold distance (e.g., one mile) of the location corresponding to the latitude "X1" and the longitude "Y1" that the data filter 324 identifies from parsing the example cell tower-specific RF Layer 3 data record 1802. If the RF Layer 1 data record is within the threshold distance, the example data filter 324 removes and/or filters out the RF Layer 1 data record such that the data record will not be considered by the example data analyzer 322 when the example data analyzer 322 processes the lower-ranking RF Layer 1 data records. If the RF Layer 1 data record is not within the threshold distance, the example data filter 324 foregoes filtering the RF Layer 1 data record such that the data record will be considered by the example data analyzer 322 when the example data analyzer 322 processes the lower-ranking data records.

Following the execution of blocks 1902-1912 of the sub-process 614 described above in connection the flowchart of FIG. 19, the sub-process 614 returns to block 614 of the example program 600 of FIG. 6, and the example program 600 then proceeds to block 608.

Upon the program 600 returning to block 608, whether from block 612 or from block 614, the example location estimator 124, via the example data analyzer 322 of FIG. 3, determines an estimated location for respective ones of the cell towers residing in the area of interest by processing the data records associated with the lower-ranked source, as those data records then represent the highest-ranked source that has not already been used to estimate the location of a cell tower residing within the area of interest. For example, in a scenario where the data that was collected from the example data collector 104 of FIG. 3 includes only data obtained from RF Layer 3 sources and RF Layer 1 sources, the example data analyzer 322, having first processed the data records and/or data structures associated with the higher-ranking RF Layer 3 source type as described above in connection with sub-process 608A of FIG. 12, will next proceed with processing the data records and/or data structures associated with the lower-ranking RF Layer 1 source type.

Figure 20:
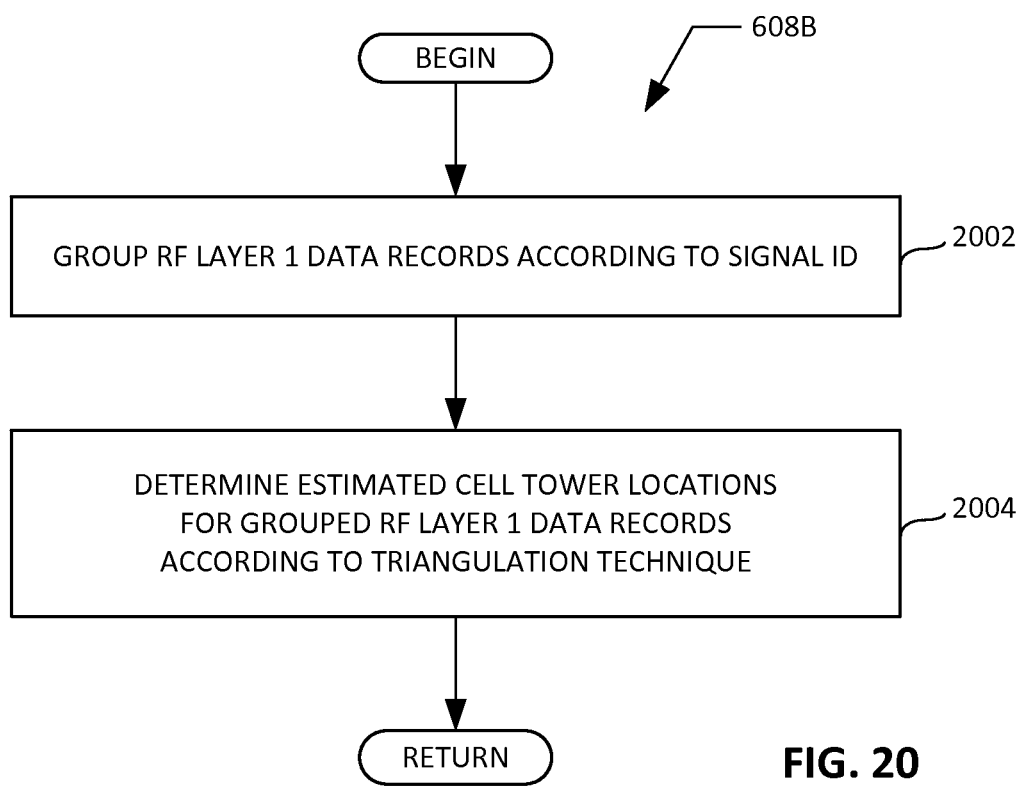
FIG. 20 is a flowchart representative of example machine-readable instructions that may be executed to implement the example data analyzer of FIG. 3 for RF Layer 1 data.

When the data records associated with the highest-ranked source that has not already been used to estimate the location of a cell tower residing within the area of interest constitute RF Layer 1 data records, the example program 600 executes a sub-process at block 608 with respect to the RF Layer 1 data records. FIG. 20 is a flowchart representative of example machine-readable instructions 608B that may be executed to implement the example data analyzer 322 of FIG. 3 for RF Layer 1 data records in connection with the sub-process 608B associated with block 608 of FIG. 6. The example program 608B of FIG. 20 begins when the example data analyzer 322 of FIG. 3 groups, categorizes and/or otherwise organizes the RF Layer 1 data records having the same Signal IDs (block 2002). The data analyzer 322 then applies conventional triangulation techniques to the grouped RF Layer 1 data records to determine an estimated location of a cell tower from which the grouped RF Layer 1 signals were received (block 2004). In some examples, the applied triangulation techniques are based on the signal and/or message information (e.g., the Signal Power measurement that was received by the example data collector 104) contained in respective ones of the grouped RF Layer 1 data records, along with the location information (e.g., the latitude and longitude at which the signal was received by the example data collector 104) contained in the grouped RF Layer 1 data records. Because the estimated location is based on the quantity and quality of the RF Layer 1 data points being available for triangulation, the estimated location may demonstrate significant location error relative to the actual physical location of the cell tower for which the estimated location is being provided.

Following the execution of blocks 2002-2004 of the sub-process 608B described above in connection with the processing of RF Layer 1 data records as described in connection with the flowchart of FIG. 20, the sub-process 608B returns to block 608 of the example program 600 of FIG. 6, and the example program 600 then proceeds to block 610.

Returning to the example flowchart of FIG. 6, blocks 608, 610, 612 and 614 of the example program 600 will continue to execute in a cyclical manner as described above until the example data analyzer 322 and/or the example location estimator 124 of FIG. 3 determines, at block 610, that no additional data records are available from a lower-ranked source. Once the example data analyzer 322 and/or the location estimator 124 has made such a determination at block 610, the example program 600 proceeds to block 616 where the example report generator 326 of FIG. 3 generates an estimated location report for the cell towers (e.g., the example cell towers 110, 112, 114, 116, 118 of FIG. 1) residing within the area of interest (e.g., the example area of interest 106 of FIG. 1) based on the estimated locations determined by the example location estimator 124 (block 616).

By incrementally processing data obtained from different types of data sources, the example data analyzer 322, and/or, more generally, the example location estimator 124 of FIG.

Figure 21:
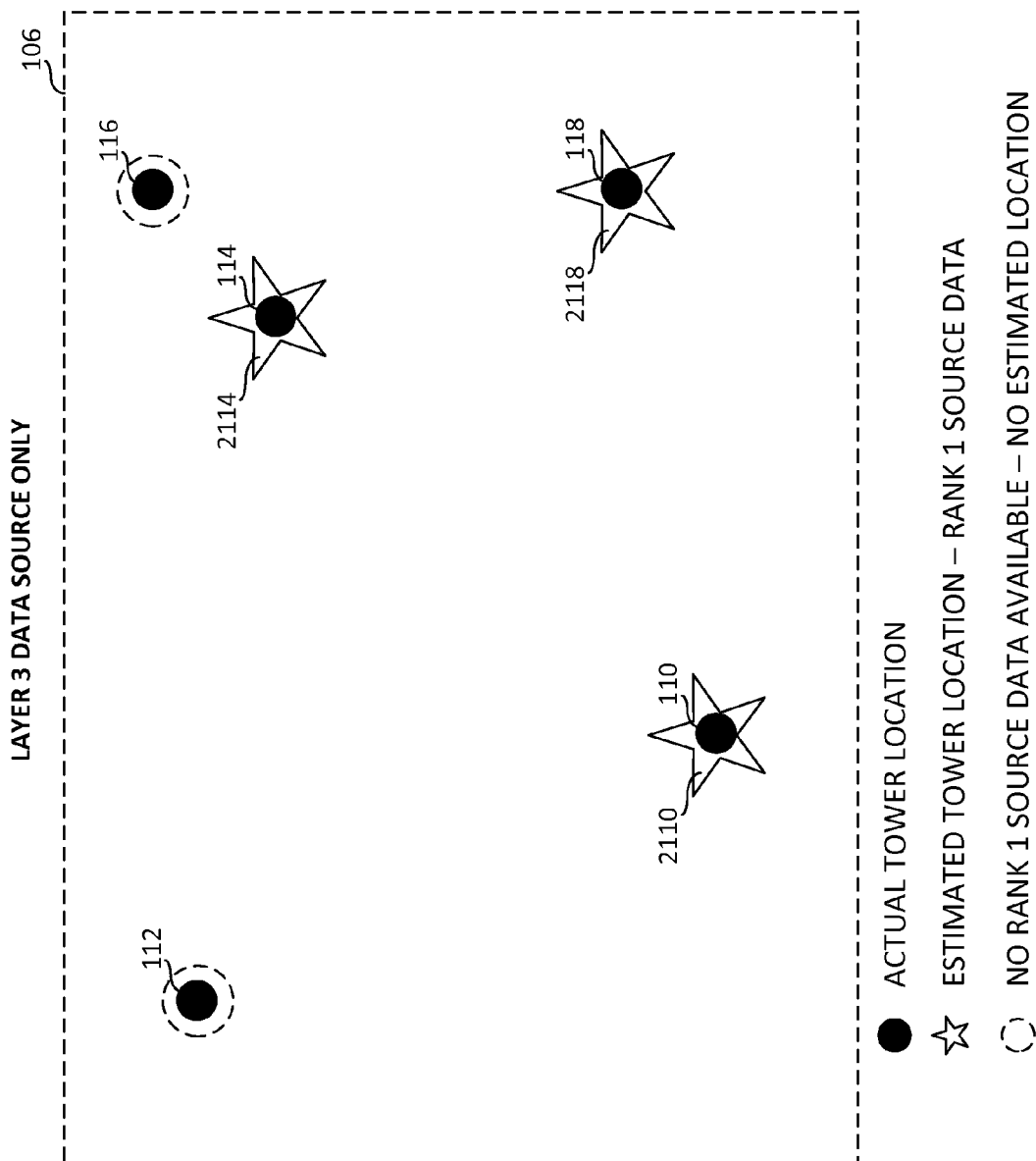
FIG. 21 is an illustration of example estimated locations for example cell towers residing within an example area of interest based on example data collected from an example high-ranking source.

3 generates a set of location estimations for cell towers residing in a particular area of interest, with the generated set of location estimations demonstrating a relatively higher degree of accuracy in comparison to corresponding sets of location estimations based on only one type of data source. For example, FIG. 21 illustrates a set of location estimations for example cell towers within an example area of interest based only on data collected from RF Layer 3 sources. FIG. 21 is derived from the example cell towers 110, 112, 114, 116, 118 located within the example area of interest 106 of FIG. 1. In the illustrated example of FIG. 21, RF Layer 3 signals including RF Layer 3 data and/or messages are transmitted by the example cell towers 110, 114 and 116. However, as a result of blocking or masking, RF Layer 3 signals including RF Layer 3 data and/or messages are not transmitted by either of the example cell towers 112 or 116. Accordingly, the example location estimator 124 of FIGS. 1 and/or 3, if it were to rely solely on data collected from the example RF Layer 3 signal transmitting cell towers, would generate highly accurate location estimations 2110, 2114, 2118 for corresponding ones of the example cell towers 110, 114 and 118, but would fail to generate any location estimations for either of the example cell towers 112 or 116. In such a scenario, the location estimator 124 has only provided location estimations for three out of the five cell towers that actually reside within the example area of interest 106, thus making the set of location estimates for the area of interest 106 inaccurate to a certain degree.

Figure 22:
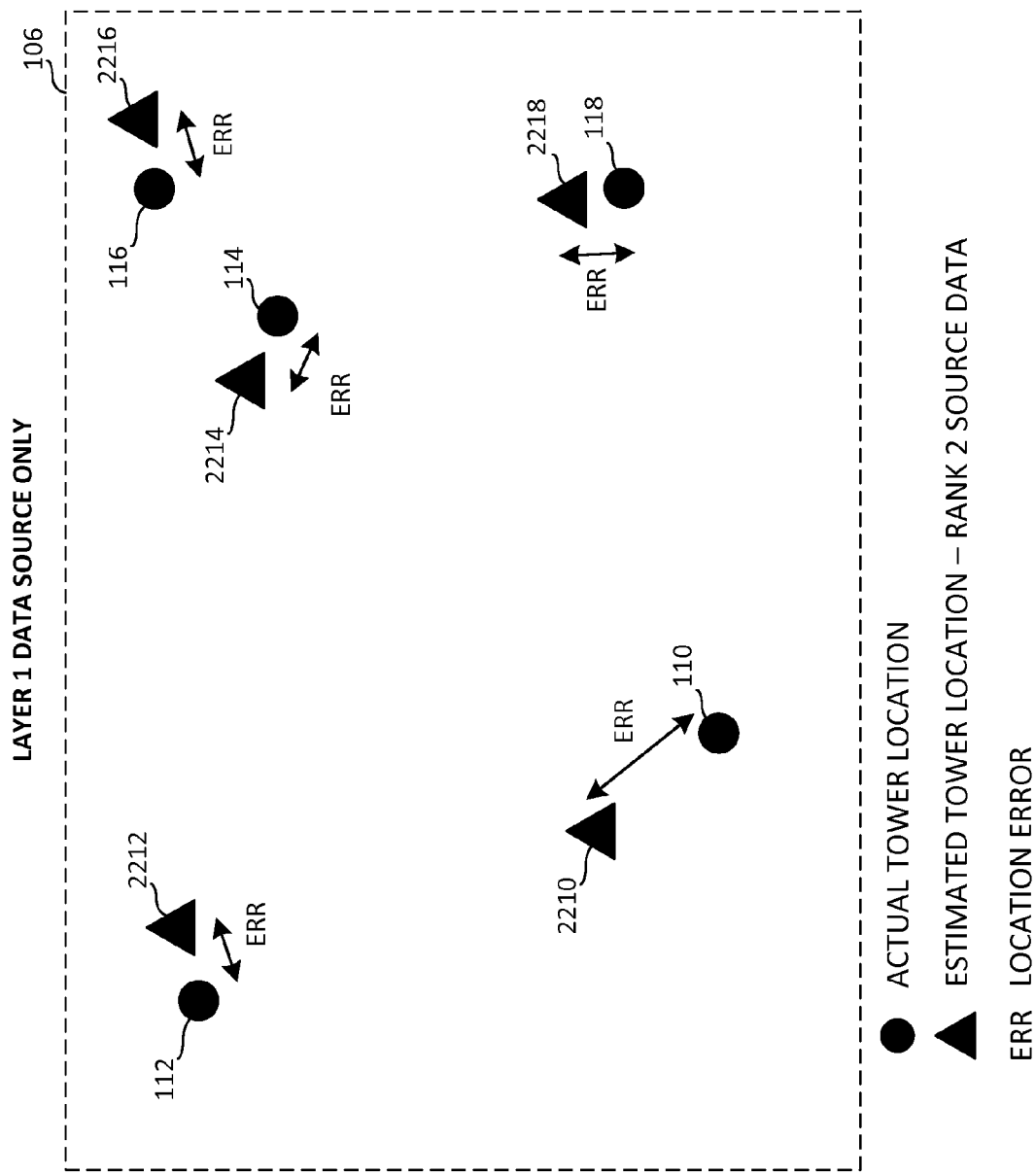
FIG. 22 is an illustration of example estimated locations for example cell towers residing within an example area of interest based on example data collected from an example low-ranking source.

Similar inaccuracies would result if the example location estimator 124 of FIGS. 1 and/or 3 were to rely solely on data collected from RF Layer 1 data sources. For example, FIG. 22 illustrates a set of location estimations for example cell towers within an example area of interest based only on data collected from RF Layer 1 sources. Like FIG. 21, FIG. 22 is derived from the example cell towers 110, 112, 114, 116, 118 located within the example area of interest 106 of FIG. 1. In the illustrated example of FIG. 21, RF Layer 1 signals including RF Layer 1 data and/or messages are transmitted by each of the example cell towers 110, 112, 114, 116 and 118. While the example location estimator 124, if it were to rely solely on data collected from the example RF Layer 1 signal transmitting cell towers, would generate location estimations 2210, 2212, 2214, 2216, 2218 for corresponding ones of the example cell towers 110, 112, 114, 116 and 118, the location estimates demonstrate significant location errors as a result of the location estimates being generated by triangulation methodologies, thus making the set of location estimates for the area of interest 106 inaccurate to a certain degree.

Figure 23:
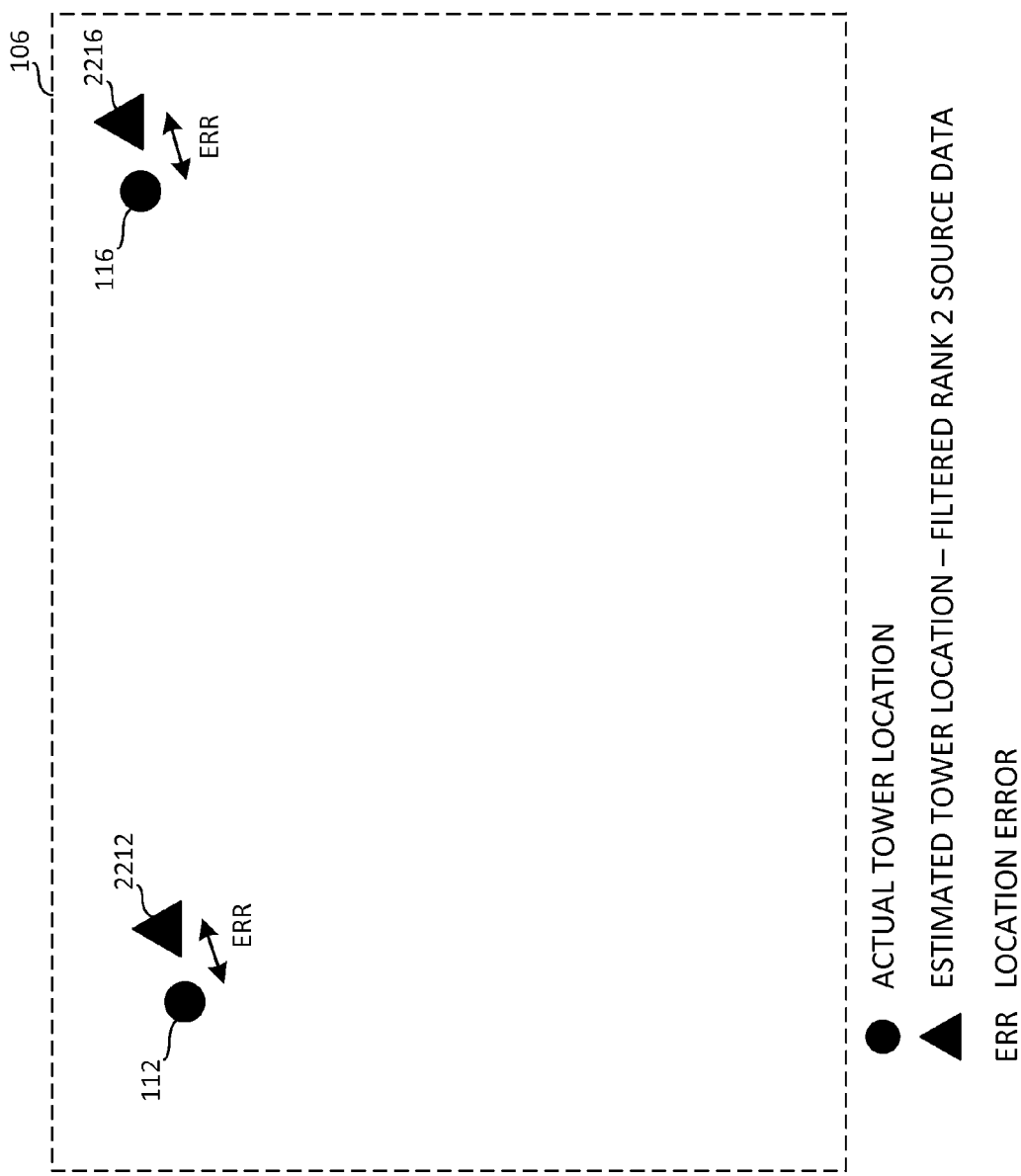
FIG. 23 is an illustration of the example estimated locations shown in FIG. 22 after the example estimated locations shown in FIG. 22 have been filtered.

In contrast to the aforementioned examples described in connection with FIGS. 21 and 22, the example location estimator 124 of FIGS. 1 and/or 3 generates a set of location estimations for the example area of interest 106 of FIG. 1 based on multiple types of data sources. To further increase the accuracy of the generated location estimations, the example location estimator 124, via the example data filter 324, filters out data obtained from a lower-ranking data source (e.g., an RF Layer 1 data source) that relates to a particular cell tower for which the example location estimator 124 has already generated a location estimation based on data obtained from a higher-ranking data source (e.g., an RF Layer 3 data source). For example, FIG. 23 illustrates the example estimated locations shown in FIG. 22 that were based solely on RF Layer 1 data sources after those example estimated locations have been filtered by the example data filter 324 so as to avoid and/or otherwise prevent duplication of the example estimated locations shown in FIG. 21 that were based solely on the higher-ranking RF Layer 3 data sources. Accordingly, the location estimations 2210, 2214, 2218 appearing in FIG. 22 associated with corresponding ones of the example cell towers 110, 114 and 118, have been filtered out and do not appear in FIG. 23. The location estimations 2212, 2216 appearing in FIG. 22, however, do still appear in FIG. 23, as those particular location estimation are respectively associated with the example cell towers 112 and 116 from which, as shown and described above in connection with FIG. 21, RF Layer 3 data was not available and RF Layer 3-based location estimations were not provided.

Figure 24:
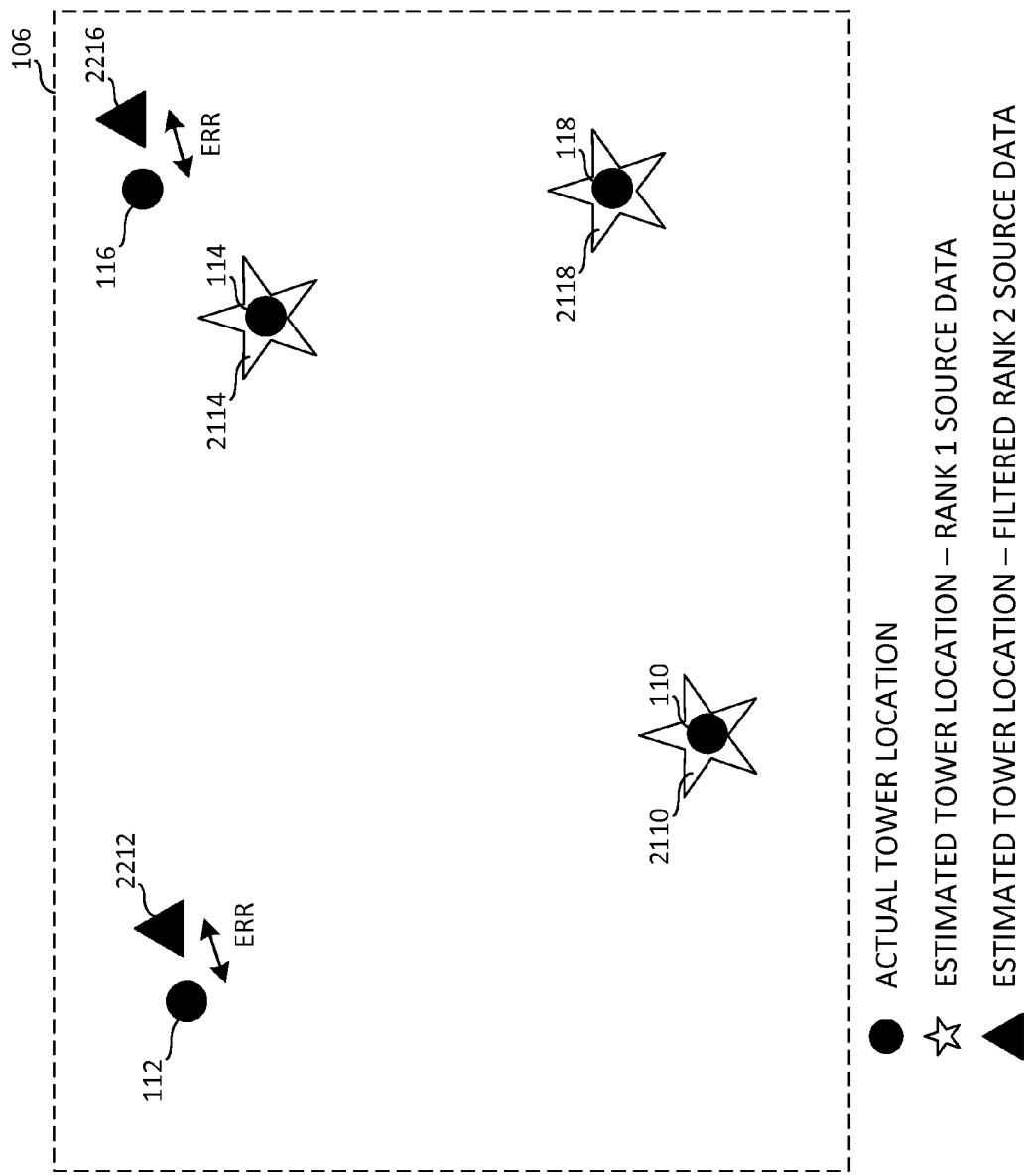
FIG. 24 is an illustration of the example estimated locations shown in FIG. 21 combined with the example estimated locations shown in FIG. 23.
Figure 25:
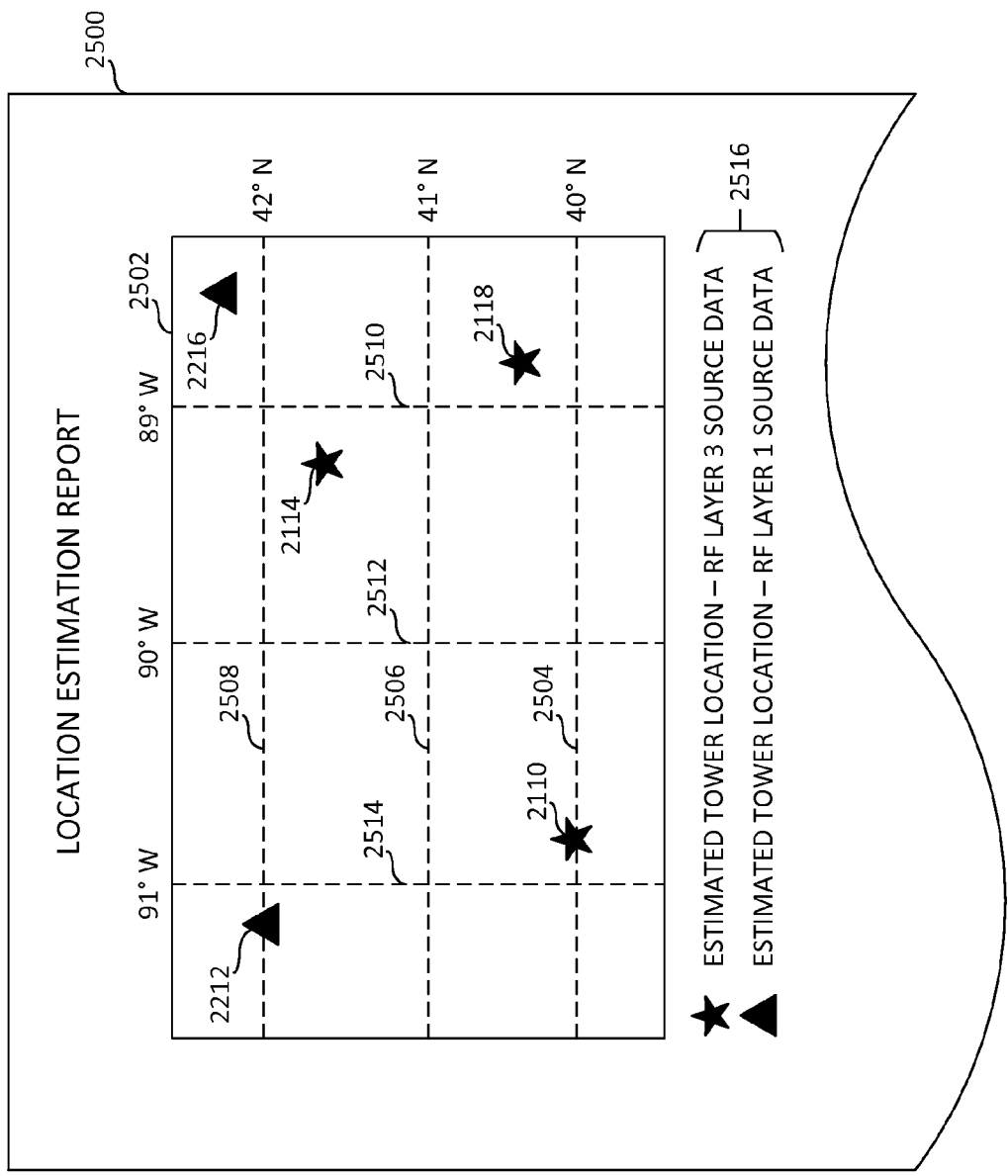
FIG. 25 is an illustration of an example report that may be generated by the example report generator of FIG. 3.

Once the lower-ranking data has been filtered, the example location estimator 124 of FIGS. 1 and/or 3 generates a combined set of location estimations based on the collected and processed data associated with the higher-ranking source (e.g., RF Layer 3 data) and the collected, filtered and processed data associated with the lower-ranking source (e.g., RF Layer 1 data). For example, FIG. 24 illustrates a set of location estimations for the example area of interest 106 derived by combining the example RF Layer 3-based estimated locations 2110, 2114, 2118 shown in FIG. 21 with the example filtered RF Layer 1-based estimated locations 2212, 2216 shown in FIG. 23. The set of combined location estimations illustrated in FIG. 24 demonstrates an overall increased accuracy relative to the location estimations that were generated based on just one type of data source, as shown and described in connection with FIGS. 21 and 22. For example, the set of location estimations shown in FIG. 24 includes location estimations 2110, 2212, 2114, 2216, 2118 for all of the corresponding example cell towers 110, 112, 114, 116, 118 that actually reside in the example area of interest 106, whereas the location estimations 2110, 2114, 2118 shown in FIG. 21 accounted only for the example cell towers 110, 114 and 118. Furthermore, the set of location estimations shown in FIG. 24 provides highly accurate RF Layer 3-based location estimations 2110, 2114, 2118 for corresponding ones of the example cell towers 110, 114 and 118 residing in the example area of interest 106, whereas the location estimations 2210, 2214, 2218 shown in FIG. 22 provided less accurate RF Layer 1-based location estimations for those same example cell towers 110, 114 and 118. Thus, the example location estimator 124, and/or, more generally, the example location estimation system 300, generates a set of location estimations for cell towers residing in a particular area of interest, wherein the generated set of location estimations demonstrates a higher degree of accuracy in comparison to corresponding sets of location estimations based on only one type of data source FIGS. 25 and 26 are illustrations of example reports that may be generated by the example report generator 326 of FIG. 3. In the illustrated examples of FIGS. 25 and 26, the example reports are based on the example estimated locations described above in connection with FIG. 24. The example report 2500 of FIG. 25 includes, in graphical form, an example map 2502 corresponding to the example area of interest 106 (FIG. 1) showing the relative estimated locations 2110, 2212, 2114, 2216, 2118 for corresponding ones of the example cell towers 110, 112, 114, 116, 118 residing in the example area of interest 106 of FIG. 1. The example map 2502 includes one or more horizontal lines 2504, 2506, 2508 indicative of latitudes within the example area of interest 106, as well as one or more vertical lines 2510, 2512, 2514 indicative of longitudes within the example area of interest 106. The example report 2500 further includes an example legend 2516 containing information by which the type of data source associated with each estimated location marked on the example map 2502 can be determined. For example, the legend 2516 of FIG. 25 indicates that estimated locations marked with a star-shaped symbol in the example map 2502 are associated with an RF Layer 3 data source, while estimated locations marked with a triangle-shaped symbol in the example map 2502 are associated with an RF Layer 1 data source.

The example report 2600 of FIG. 26 includes information that is the same as and/or similar to the information shown in FIG. 25, the primary difference being that the example report 2600 provides the information in textual, as opposed to graphical, form. As shown in FIG. 26, the example report 2600 includes a description of the example area of interest 106, identifications (e.g., Tower IDs) of the example cell towers 110, 112, 114, 116, 118 residing within the example area of interest 106, identifications of example estimated locations (e.g., latitudes and longitudes) associated with the identified example cell towers, and identifications of the type of data source (e.g., RF Layer 3) from which the estimated locations were generated.

While the example reports 2500, 2600 shown in FIGS. 25 and 26 are illustrated as being of specific forms, reports generated by the example report generator 326 may be of any form and/or file type, and may contain more or less information than what is illustrated in connection with the example reports 2500, 2600 of FIGS. 25 and 26.

Figure 27:
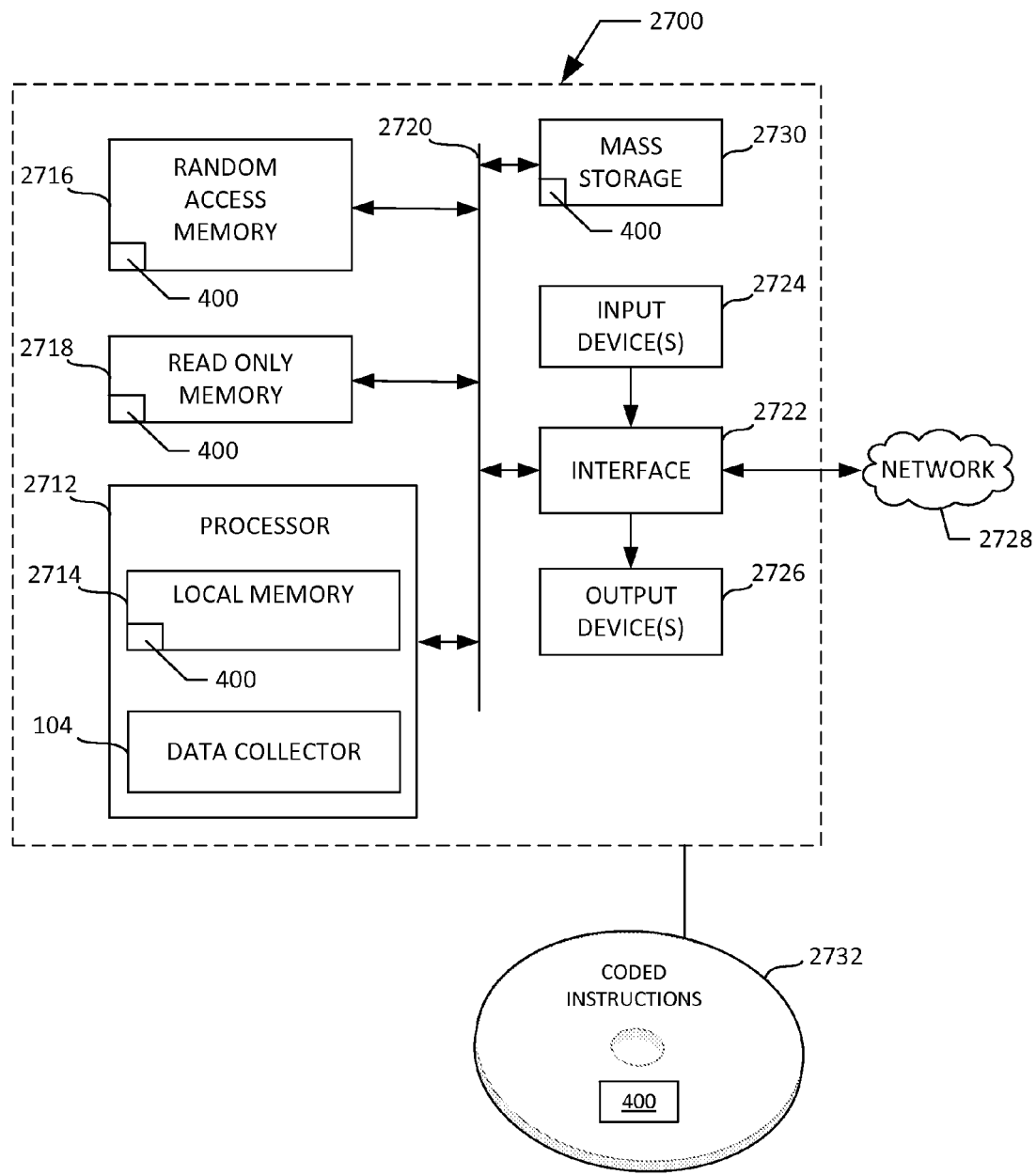
FIG. 27 is a block diagram of an example processing platform capable of executing the example instructions of FIG. 4 to implement the example mobile unit of FIGS. 1 and/or 3.

FIG. 27 is a block diagram of an example processor platform 2700 capable of executing the instructions of FIG. 4 to implement the example mobile unit 102 of FIGS. 1 and 3. The processor platform 2700 can be, for example, a server, a personal computer, a smartphone, or any other type of computing device.

The processor platform 2700 of the illustrated example includes a processor 2712. The processor 2712 of the illustrated example is hardware. For example, the processor 2712 can be implemented by one or more integrated circuits, logic circuits, microprocessors or controllers from any desired family or manufacturer.

The processor 2712 of the illustrated example includes the example data collector 104 of FIGS. 1 and/or 3. The processor 2712 also includes a local memory 2714 (e.g., a cache). The processor 2712 of the illustrated example is in communication with a main memory including a volatile memory 2716 and a non-volatile memory 2718 via a bus 2720. The volatile memory 2716 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2718 may be implemented by flash memory and/or any other desired type of memory device. Access to the main memory 2716, 2718 is controlled by a memory controller.

The processor platform 2700 of the illustrated example also includes an interface circuit 2722. The interface circuit 2722 may be implemented by any type of interface standard, such as an Ethernet interface, a universal serial bus (USB), and/or a PCI express interface.

In the illustrated example, one or more input devices 2724 are connected to the interface circuit 2722. The input device(s) 2724 permit(s) a user to enter data and commands into the processor 2712. The input device(s) can be implemented by, for example, a keyboard, a mouse, a touchscreen, a track-pad, a trackball, isopoint and/or a voice recognition system.

One or more output devices 2726 are also connected to the interface circuit 2722 of the illustrated example. The output devices 2726 can be implemented, for example, by display devices (e.g., a liquid crystal display, a cathode ray tube display (CRT), a touchscreen, a printer and/or speakers). The interface circuit 2722 of the illustrated example, thus, typically includes a graphics driver card, a graphics driver chip or a graphics driver processor.

The interface circuit 2722 of the illustrated example also includes a communication device such as a transmitter, a receiver, a transceiver, a modem and/or network interface card to facilitate exchange of data with external machines (e.g., computing devices of any kind) via a network 2728 (e.g., an Ethernet connection, a digital subscriber line (DSL), a telephone line, coaxial cable, a cellular telephone system, etc.).

The processor platform 2700 of the illustrated example also includes one or more mass storage devices 2730 for storing software and/or data. Examples of such mass storage devices 2730 include floppy disk drives, hard drive disks, compact disk drives, Blu-ray disk drives, RAID systems, and digital versatile disk (DVD) drives.

The coded instructions 400 of FIG. 4 may be stored in the mass storage device 2730, in the volatile memory 2716, in the non-volatile memory 2718, and/or on a removable tangible computer readable storage medium 2732 such as a CD or DVD.

Figure 28:
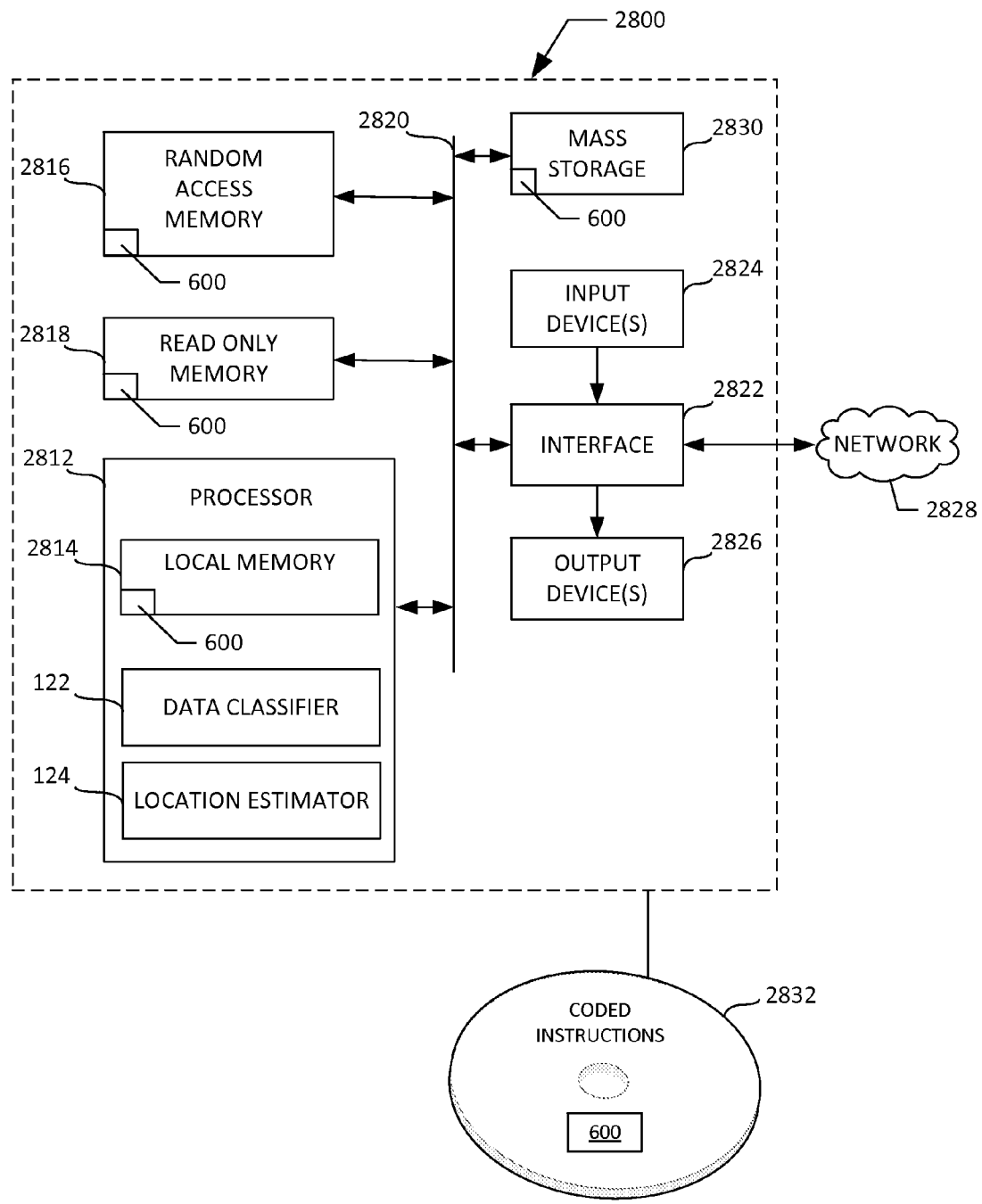
FIG. 28 is a block diagram of an example processing platform capable of executing the example instructions of FIGS. 6, 13 and/or 20 to implement the example central data facility of FIGS. 1 and/or 3.

FIG. 28 is a block diagram of an example processor platform 2800 capable of executing the instructions of FIGS. 6, 12, 19 and/or 20 to implement the example central data facility 120 of FIGS. 1 and/or 3. The processor platform 2800 can be, for example, a server, a personal computer, or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors or controllers from any desired family or manufacturer.

The processor 2812 of the illustrated example includes the example data classifier 122 and the example location estimator 124 of FIGS. 1 and 3. The processor 2812 also includes a local memory 2814 (e.g., a cache). The processor 2812 of the illustrated example is in communication with a main memory including a volatile memory 2816 and a non-volatile memory 2818 via a bus 2820. The volatile memory 2816 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2818 may be implemented by flash memory and/or any other desired type of memory device. Access to the main memory 2816, 2818 is controlled by a memory controller.

The processor platform 2800 of the illustrated example also includes an interface circuit 2822. The interface circuit 2822 may be implemented by any type of interface standard, such as an Ethernet interface, a universal serial bus (USB), and/or a PCI express interface.

In the illustrated example, one or more input devices 2824 are connected to the interface circuit 2822. The input device(s) 2824 permit(s) a user to enter data and commands into the processor 2812. The input device(s) can be implemented by, for example, a keyboard, a mouse, a touchscreen, a track-pad, a trackball, isopoint and/or a voice recognition system.

One or more output devices 2826 are also connected to the interface circuit 2822 of the illustrated example. The output devices 2826 can be implemented, for example, by display devices (e.g., a liquid crystal display, a cathode ray tube display (CRT), a touchscreen, a printer and/or speakers). The interface circuit 2822 of the illustrated example, thus, typically includes a graphics driver card, a graphics driver chip or a graphics driver processor.

The interface circuit 2822 of the illustrated example also includes a communication device such as a transmitter, a receiver, a transceiver, a modem and/or network interface card to facilitate exchange of data with external machines (e.g., computing devices of any kind) via a network 2828 (e.g., an Ethernet connection, a digital subscriber line (DSL), a telephone line, coaxial cable, a cellular telephone system, etc.).

The processor platform 2800 of the illustrated example also includes one or more mass storage devices 2830 for storing software and/or data. Examples of such mass storage devices 2830 include floppy disk drives, hard drive disks, compact disk drives, Blu-ray disk drives, RAID systems, and digital versatile disk (DVD) drives.

The coded instructions 600 of FIGS. 6, 12, 19 and/or 20 may be stored in the mass storage device 2830, in the volatile memory 2816, in the non-volatile memory 2818, and/or on a removable tangible computer readable storage medium 2832 such as a CD or DVD.

From the foregoing, it will be appreciated that by incrementally processing data obtained from different types of data sources, the above disclosed methods, apparatus and articles of manufacture advantageously generate a set of location estimations for cell towers residing in a particular area of interest, with the generated set of location estimations demonstrating a relatively higher degree of accuracy in comparison to corresponding sets of location estimations based on only one type of data source. As a result of the heightened accuracy demonstrated by the location estimations generated by the above disclosed methods, apparatus and articles of manufacture, the generated location estimations more accurately reflect the true configuration and/or layout of a service provider's network, thus making the generated location estimations more valuable not only to the service provider that owns and/or operates the cell towers and/or cellular network of interest, but to third-party entities (e.g., a competing service provider, or an information collection/measurement company) as well.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer implemented method for estimating locations of cell towers, the method comprising:
    ranking, with a source ranker, a first data source having a first accuracy relative to a second data source having a second accuracy;
    identifying based on the ranking of the first data source relative to the second data source, a higher-ranking data source and a lower-ranking data source;
    identifying, with a location estimator, an estimated location for respective ones of the cell towers based on data collected from the higher-ranking data source;
    when an estimated location for respective ones of the cell towers has not been identified based on data collected from the higher-ranking data source, identifying, with the location estimator, an estimated location for respective ones of the cell towers based on data collected from the lower-ranking data source, wherein at least one of the source ranker or the location estimator includes a processor; and
    generating a report, the report including the identified estimated location for respective ones of the cell towers.

2. A method as defined in claim 1, wherein the data collected from the higher-ranking data source includes RF Layer 3 data.

3. A method as defined in claim 2, wherein the RF Layer 3 data includes a latitude and a longitude, the latitude and the longitude both being associated with a transmitter of a cell tower.

4. A method as defined in claim 1, wherein the data collected from the lower-ranking data source includes RF Layer 1 data.

5. A method as defined in claim 4, wherein identifying the estimated location for respective ones of the cell towers based on data collected from the lower-ranking data source includes applying a triangulation technique to signal information contained in the RF Layer 1 data.

6. A method as defined in claim 1, further including, prior to identifying the estimated location for respective ones of the cell towers based on data collected from the lower-ranking data source, filtering out data collected from the lower-ranking data source that is associated with respective ones of the cell towers for which an estimated location has been identified based on data collected from the higher-ranking data source.

7. A system for estimating locations of cell towers, the system comprising:
    a source ranker to:
        rank a first data source having a first accuracy relative to a second data source having a second accuracy; and
        identify, based on the ranking of the first data source relative to the second data source, a higher-ranking data source and a lower-ranking data source;
    a location estimator to:
        identify an estimated location for respective ones of the cell towers based on data collected from the higher-ranking data source; and
        when an estimated location for respective ones of the cell towers has not been identified based on data collected from the higher-ranking data source, identify an estimated location for respective ones of the cell towers based on data collected from the lower-ranking data source; and
    a report generator to generate a report, the report including the identified estimated location for respective ones of the cell towers.

8. A system as defined in claim 7, wherein the data collected from the higher-ranking data source includes RF Layer 3 data.

9. A system as defined in claim 8, wherein the RF Layer 3 data includes a latitude and a longitude, the latitude and the longitude both being associated with a transmitter of a cell tower.

10. A system as defined in claim 7, wherein the data collected from the lower-ranking data source includes RF Layer 1 data.

11. A system as defined in claim 10, wherein the location estimator, when identifying the estimated location for respective ones of the cell towers based on data collected from the lower-ranking data source, is to apply a triangulation technique to signal information contained in the RF Layer 1 data.

12. A system as defined in claim 7, further including a data filter to, prior to identifying the estimated location for respective ones of the cell towers based on data collected from the lower-ranking data source, filter out data collected from the lower-ranking data source that is associated with respective ones of the cell towers for which an estimated location has been identified based on data collected from the higher-ranking data source.

13. A tangible computer readable storage medium comprising computer readable instructions for estimating locations of cell towers, wherein the instructions, when executed, cause a processor to at least:
  rank a first data source having a first accuracy relative to a second data source having a second accuracy;
  identify, based on the ranking of the first data source relative to the second data source, a higher-ranking data source and a lower-ranking data source;
  identify an estimated location for respective ones of the cell towers based on data collected from the higher-ranking data source;
  when an estimated location for respective ones of the cell towers has not been identified based on data collected from the higher-ranking data source, identify an estimated location for respective ones of the cell towers based on data collected from the lower-ranking data source; and
  generate a report, the report including the identified estimated location for respective ones of the cell towers.

14. A storage medium as defined in claim 13, wherein the data collected from the higher-ranking data source includes RF Layer 3 data.

15. A storage medium as defined in claim 14, wherein the RF Layer 3 data includes a latitude and a longitude, the latitude and the longitude both being associated with a transmitter of a cell tower.

16. A storage medium as defined in claim 13, wherein the data collected from the lower-ranking data source includes RF Layer 1 data.

17. A storage medium as defined in claim 16, wherein the instructions are further to cause the processor to at least, when identifying the estimated location for respective ones of the cell towers based on data collected from the lower-ranking data source, apply a triangulation technique to signal information contained in the RF Layer 1 data.

18. A storage medium as defined in claim 13, wherein the instructions are further to cause the processor to at least, prior to identifying the estimated location for respective ones of the cell towers based on data collected from the lower-ranking data source, filter out data collected from the lower-ranking data source that is associated with respective ones of the cell towers for which an estimated location has been identified based on data collected from the higher-ranking data source.

* * * * *